(12) United States Patent
Shneorson et al.

(10) Patent No.: US 7,975,165 B2
(45) Date of Patent: Jul. 5, 2011

(54) MANAGEMENT OF INFORMATION TECHNOLOGY RISK USING VIRTUAL INFRASTRUCTURES

(75) Inventors: Oren Shneorson, Palo Alto, CA (US); Jeffrey J. Hanson, Belmont, CA (US); Corey Pace Caudle, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 261 days.

(21) Appl. No.: 12/491,873

(22) Filed: Jun. 25, 2009

(65) Prior Publication Data

US 2010/0332889 A1 Dec. 30, 2010

(51) Int. Cl.
*G06F 11/00* (2006.01)
(52) U.S. Cl. .......................................................... 714/3
(58) Field of Classification Search .................. 714/1–3, 714/100, 47.1–47.3
See application file for complete search history.

(56) References Cited

U.S. PATENT DOCUMENTS

| | | | | |
|---|---|---|---|---|
| 2009/0307166 A1* | 12/2009 | Routray et al. | ................. | 706/46 |
| 2010/0100877 A1* | 4/2010 | Greene et al. | ..................... | 718/1 |
| 2010/0100888 A1* | 4/2010 | Tene et al. | ...................... | 718/104 |
| 2010/0175108 A1* | 7/2010 | Protas | ............................. | 726/3 |
| 2010/0199351 A1* | 8/2010 | Protas | ............................. | 726/25 |

OTHER PUBLICATIONS

Stonebumer, Gary et al., "Risk Management Guide for Information Technology Systems", "Recommendations of the National Institute of Standards and Technology" National Institute of Standards and Technology, Special Publication 800-30, pp. 1-25.
Bowen, Pauline et al., "Information Security Handbook: A Guide for Managers", National Institute of Standards and Technology, Technology Administration U.S. Department of Commerce, Special Publication 800-100, pp. 1-178.
"International Convergence of Capital Measurement and Capital Standards, A Revised Framework", Basel Committee on Banking Supervision, Bank for International Settlements, Basel, Switzerland, Jun. 2004, Section V, Operational Risk.
"One Hundred Seventh Congress of the United States of America at the Second Session" City of Washington, Wednesday, Jan. 23, 2002, Sarbanes-Oxley Act of 2002, Sections 302, 404 and 409, pp. 33-34, p. 45 and p. 47.

* cited by examiner

*Primary Examiner* — Bryce P Bonzo
(74) *Attorney, Agent, or Firm* — Leonard E. Heyman

(57) ABSTRACT

Information Technology Risk to an organization is associated with a plurality of virtual machines (VMs) each running on a plurality of hosts, each host being a computer system connected to a network and in communication with a risk orchestrator, which receives threat indication messages (TIMs) from threat indicators. Each TIM indicates a status of a threat to which a hosts is vulnerable. Downtime probability (DTP) resulting from the threat and an overall host DTP for each host are calculated. For each VM, a risk value associated with the VM is calculated as a function of the host DTP for and an impact for the VM, the impact being a value reflecting a relative importance of the VM to the organization. Each VM requiring risk mitigation is identified and prioritized in accordance with a policy, and a configured mitigation control action may be carried out for each VM requiring risk mitigation.

21 Claims, 10 Drawing Sheets

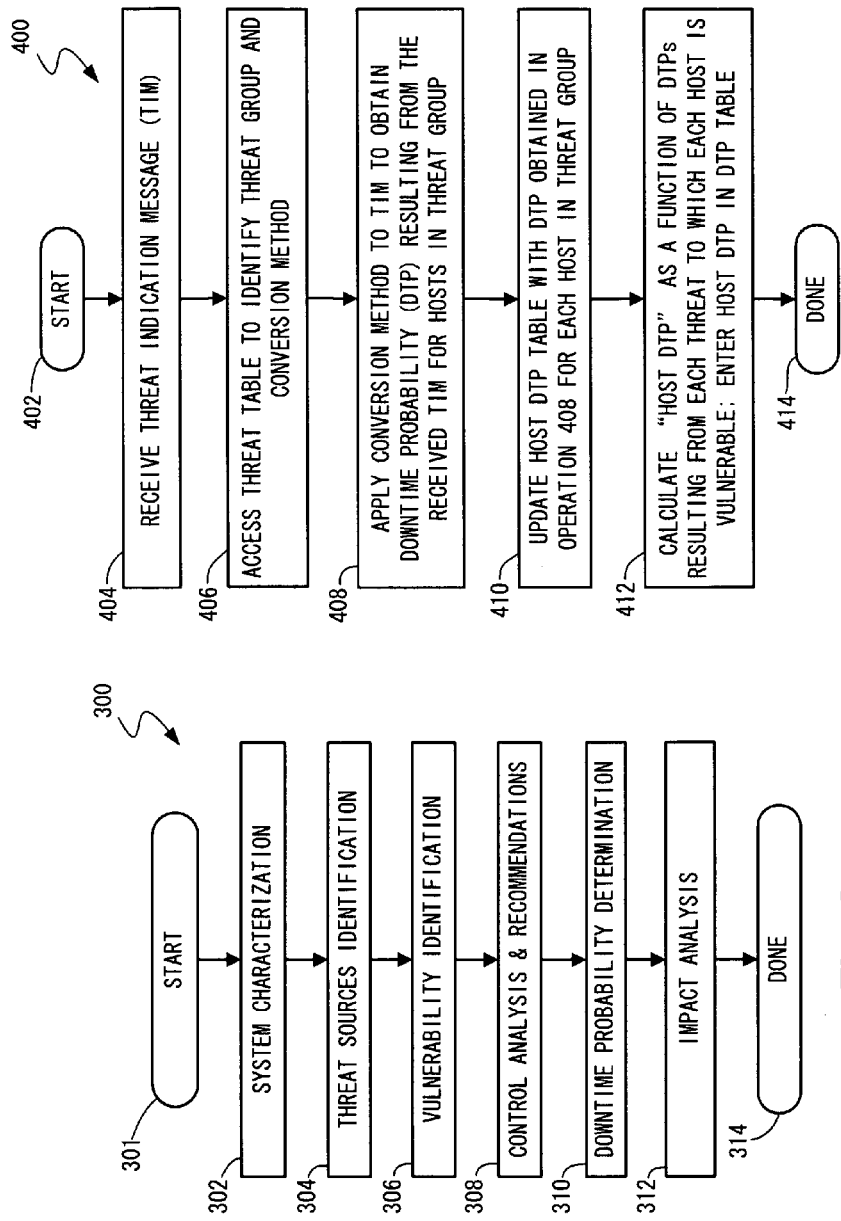

```
<TIM UID="TIND_T_L1">
<value units="Fahrenheit"
 type="integer">78</value>
<additionalFields>
  <field>
    <name>Time</name>
    <description>1am</description>
  </field>
  <field>
    <name>Threshold set</name>
    <description>70</description>
  </field>
  <field>
    <name>Contact</name>
    <description>lab1 manager beeper
    </description>
  </field>
</additionalFields>
</TIM>
```

```
<TIM UID=" webServer1_IDS" >
<value type=" boolean" >true</value>
<additionalFields>
  <field>
    <name>Time</name>
    <description>1am</description>
  </field>
  <field>
    <name>Intrusion type</name>
    <description>file integrity</description>
  </field>
  <field>
    <name>file</name>
    <description>passwd</description>
  </field>
</additionalFields>
</TIM>
```

MANAGEMENT OF INFORMATION TECHNOLOGY RISK USING VIRTUAL INFRASTRUCTURES

BACKGROUND

In any organization, risks can emanate from uncertainty in financial markets, project failures, legal liabilities, credit risk, accidents, natural causes and disasters as well as deliberate attacks from an adversary. Risk management involves two components: (1) the identification, assessment, and prioritization of risks, and (2) the coordinated and economical application of resources to minimize, monitor, and control the probability and/or impact of unfortunate events.

Information Technology (IT) risk management has become a critical element of an enterprise's risk strategy because IT has become a critical element of ongoing operations for many businesses. IT system and application failures can cause enterprises losses of up to millions of dollars per hour. To minimize risk exposure, some companies implement complex solutions to reduce risk, but most IT risk management solutions are designed to isolate systems from risk or to recover from catastrophic events, rather than to react to changing risk in the system.

Among the many advances in enterprise computer systems is the virtualization of computer resources. Virtualization of computer resources generally involves a software abstraction and redirection of underlying computer system hardware to one or more virtual machines. The virtual machines isolate operating systems and applications from underlying hardware and each other. Hardware can therefore be shared among a plurality of virtual machines each having a corresponding operating system.

Each virtual machine (VM) is a complete execution environment, and servers provide a user interface over the network connection so that user inputs and outputs are communicated between the user and the VM. As software abstractions of complete computer systems, virtual machines provide many benefits to the user aside increased hardware utilization. For instance, virtual machines maybe moved, or "migrated," from one physical computer system to another, even while the virtual machine is running. The migration of a virtual machine from one physical computer system to another without significant interruption is referred to herein as "live migration." Live migration allows for dynamic load balancing of hosts. An example of live migration is provided by VMware® VMotion™ technology. Virtualization allows other benefits such as automated maintenance, power management, storage management, etc.

SUMMARY

Risk to an organization is associated with each of a plurality of virtual machines (VMs) each running on one of a plurality of hosts, each host being a physical computer system connected to one or more networks and in communication with a risk orchestrator. The risk orchestrator receives threat indication messages (TIMs) from threat indicators. Each TIM indicates a status of a threat to which a plurality of hosts and/or VMs in a threat group are vulnerable. The risk orchestrator calculates a downtime probability resulting from the threat and a host downtime probability for each host, the host downtime probability being a function of all the downtime probabilities resulting from all threats to which the host is vulnerable. For each VM a risk value associated with the VM is calculated, the risk value being a function of the host downtime probability for the host on which the VM is running and an impact value for the VM, the impact value being a value reflecting a relative importance of the VM to the organization. Each VM requiring risk mitigation is identified and prioritized in accordance with a policy, and a configured mitigation control action may be carried out for each VM requiring risk mitigation.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 3 shows a flowchart illustrating by way of example a procedure for assessing risk and mitigation strategies in an organization using the computer network described above with reference to FIGS. 1 and 2.

FIGS. 4A, 4B, and 4C illustrate, by way of example, procedures that may be implemented by risk orchestrator for identifying threats and mitigating risk to risk-managed components of a system.

FIGS. 5A and 5B present exemplary threat indication messages.

DETAILED DESCRIPTION

The primary goal of an organization's risk management process is to protect the organization's ability to perform its mission when confronted with threats. Risk management has specific characteristics in the context of information technology (IT). The goal of the IT system administrator is to manage risk associated with IT infrastructure such that mean time between failures is maximized, and system downtime is avoided. Downtime is the loss or degradation of information availability, confidentiality, and/or integrity. When downtime cannot be avoided, risk can be reduced by lowering the system's mean time to recovery to the minimum time possible.

Figure 1:
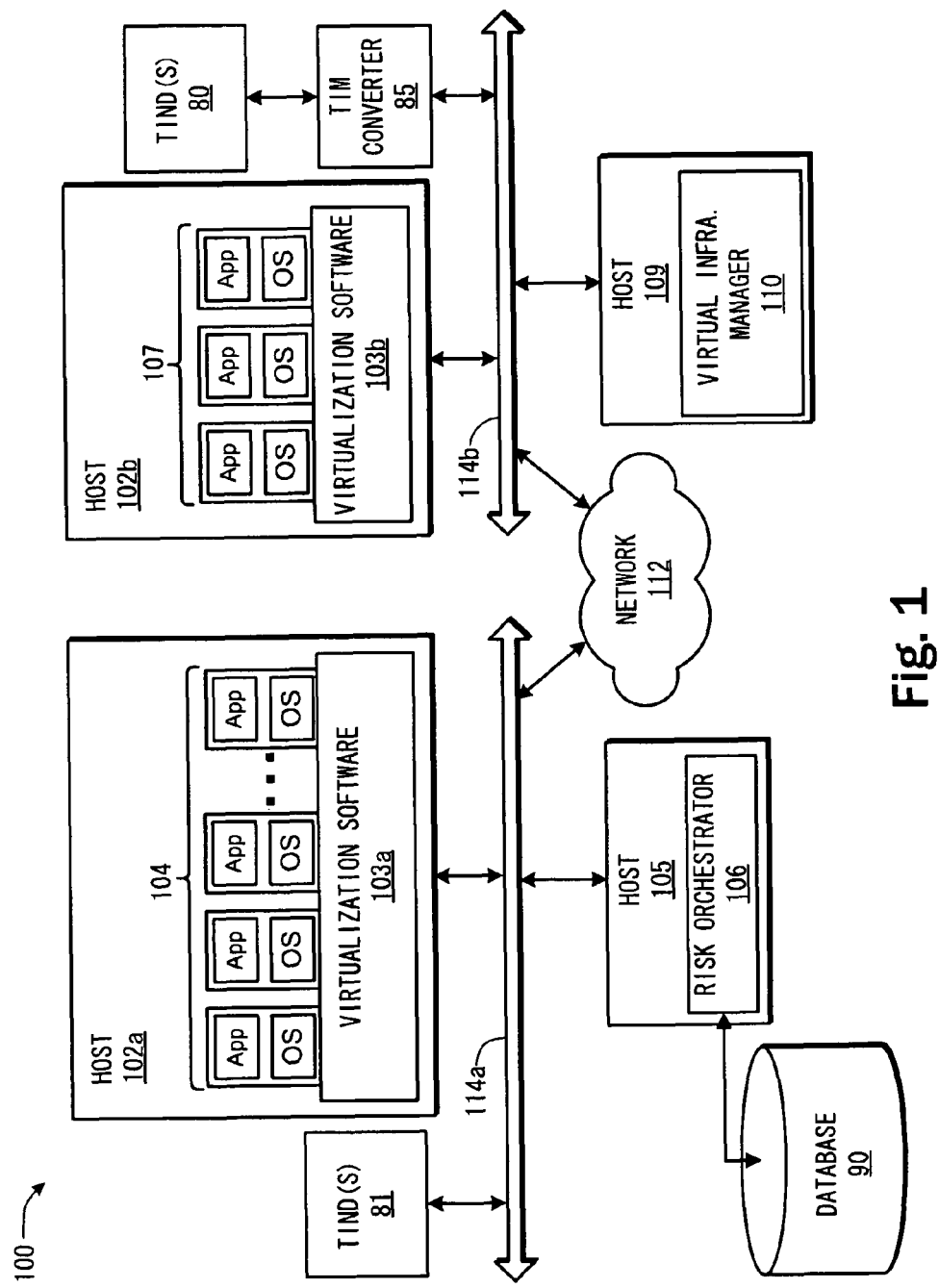
FIG. 1 is a schematic representation of a physical layout of an exemplary computer network system configured for implementing IT risk management.

FIG. 1 illustrates by way of example, a computer network system 100 including hosts 102a, 102b. Hosts 102a, 102b may be enterprise servers each executing a plurality of virtual machines. Each server may be a general purpose computer system having typical computer components such as a processor, data buses, memory, and input/output (I/O) ports. Host 102a, for example, includes n number of virtual machines (VMs) 104, and host 102b likewise runs several VMs 107. A VM is an abstraction of a physical computer system, implemented in part by virtualization software 103a, 103b. Hosts having one or more VMs running thereon may be referred to as a "VM host."

Although each network 114a, 114b are each shown having a single host, it should be understood that any number of hosts may reside on each network. Thus, hosts may reside on the same network and on the same site, or may be distributed among different networks and locations.

Each host 102a, 102b has a corresponding implementation of virtualization software 103a, 103b that supports execution of the virtual machines running in the host. In one embodiment, virtualization software 103a, 103b may each be an instance of VMware® ESX Server, commercially available from VMware, Inc. of Palo Alto, Calif. Each VM 104, 107 includes an installation of a guest operating system ("OS") and one or more applications ("App").

Hosts 105, 109 may be enterprise servers (i.e., physical computer systems) as shown or virtual machines running on one of hosts 102a, 102b (not depicted), or on a different host (not shown). Host 105 runs orchestrator 106, also referred to as risk manager. Risk orchestrator 106 is a software application that monitors risk in the system and initiates actions determined by an IT risk policy. Database 90 is a location accessible to risk orchestrator 106 for storing various data. Database 90 may be in memory of host 105, may be stored using any data structure such as a flat file, hierarchical data structure, data objects, etc. Database 90 may be contained on a local or external storage device, or a networked storage device or system which is accessed directly or using structured query language (SQL) database software or the like.

Host 109 runs a virtual infrastructure manager 110, which manages the hosts as well as VMs in system 100. VM management activities can include provisioning VMs, configuring VMs, starting and stopping VMs, migrating VMs, etc. In one embodiment, virtual infrastructure manager 110 is an implementation of VMware® vSphere™, commercially available from VMware, Inc. of Palo Alto, Calif.

Figure 2:
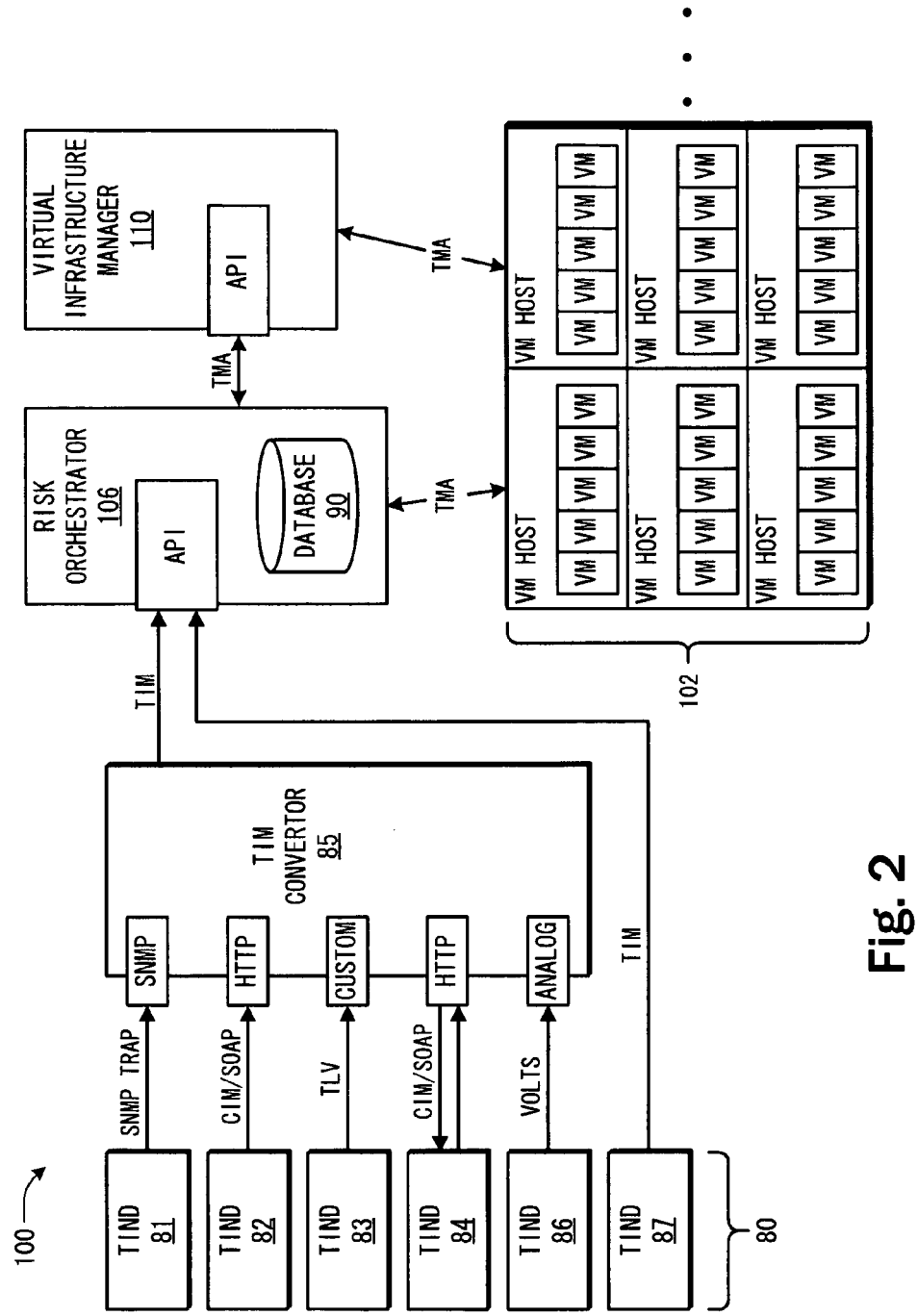
FIG. 2 is a logical representation of the computer network shown in FIG. 1.

FIG. 2 shows a logical overview of the computer network system 100 shown in FIG. 1, illustrating by way of example communications between the components of computer network system 100. Threat indicators (TIND) 80 are sensors, devices, software modules, etc., that sense or detect threats relevant to one or more of hosts 102a, 102b or VMs 104, 107. Each TIND communicates with the risk orchestrator 106 via threat indication messages (TIMs) over a well defined communications channel, protocol, and message format. TIMs are processed by risk orchestrator 106 and converted into related downtime probabilities of members of corresponding threat groups, each of which is a collection of virtual machines and hosts, as will be further described below.

Threats can be of any type that can be identified or measured. Environmental threats are common to all data centers and include threats like temperature and humidity, loss of power, smoke (fire), water, vibrations, etc. Human threats, typified by security threats, are defined as events that are either enabled by, or caused by, human beings, whether they are unintentional acts (inadvertent data entry) or deliberate actions (network based attacks, malicious software upload, unauthorized access to confidential information, etc.). Natural threats are caused by natural phenomena, such as extreme weather conditions (hurricane, tsunami, floods, etc.) or earthquakes, and capable of causing extreme damage. Hardware malfunction threats are caused by the system's hosts' vulnerability to hardware or network component malfunction. These threat sources, and others, can individually, or combined together, cause host and VM downtime.

Due to the nature of the TINDs, their different technological implementations, installment types, and communications means, not all TINDs will be able to format a message in the format required by risk orchestrator 106, nor will all of them have the means to send such message via the required protocol and network. Some TINDs may not be able to send messages to the mechanism but will rather have to be polled periodically for their values. TIM converter 85 solves this problem by providing an integration layer between TINDs 81-86 and risk orchestrator 106. TIM converter 85 generates TIMs corresponding inputs received from TINDs 81-86. TIM converter 85 therefore allows the use of off-the shelf sensors and modules that are not configured to generate TIMs consistent with the requirements of the API of risk orchestrator 106. TIM converter 85 may process different format TIND messages or signals and generates a TIM reflecting TIND messages or signals. The received or polled values are formatted into properly formatted TIM messages, e.g., as described below with reference to FIGS. 5A, 5B. The TIMs are then relayed to risk orchestrator 106. In one embodiment, TIM converter 85 is an external device or system as illustrated in FIG. 2. However, it is also possible to integrate TIM converter 85 with risk orchestrator 106. As an external device, TIM converter 85 may additionally serve as a proxy to relay received TIMs to risk orchestrator 106.

Each risk-managed host 102 has one or more vulnerabilities. For each vulnerability, one or more threat indicators (TINDs) 80 provides an indication as to whether the threat group to which the risk-managed host belongs is in jeopardy due to the vulnerability, i.e., whether the vulnerability is being exercised. These indications are reflected in the TIMs received by risk orchestrator either directly from TINDs 81-87 or via TIM converter 85.

For purpose of illustration, several types of threat indicators are shown. TIND 81 may be a simple network management protocol (SNMP) agent that provides network status information or various faults that might be detected on a managed network. TIND 82 may be a physical intrusion detection system (e.g., motion detector or burglar alarm) that generates a common information model (CIM) or SOAP protocol message. TIND 83 may be a component of a power system indicating remaining backup battery power which sends type-length-value (TLV) encoded data. TIND 84 may be a software module that accesses national weather service data in XML format. In one embodiment, TIND 84 is a server that receives queries from TIM converter 85 and responds with requested information, e.g., using CIM/SOAP protocol. In this manner, TIND 84 is required to be periodically polled for information as to the threat status. TIND 86 may be a temperature/humidity sensor which constantly transmits voltage signals corresponding to the current temperature and humidity to threat indication message (TIM) convertor 85. TIND 87 may be a water level sensor that generates and transmits properly formatted threat indication messages (TIMs) and is configured to communicate them directly to risk orchestrator 106.

Risk orchestrator 106 receives TIMs and calculates a downtime probability for each host vulnerable to the threats based on received TIMs. The downtime probabilities are entered into a downtime probability (DTP) table that may be maintained in database 90. A risk is calculated for each VM as a function of the downtime probability for the corresponding host and an impact value assigned by a network administrator or according to a policy. The impact value may have some relation to economic or other impact (loss of reputation, breach of confidentiality (privacy), integrity, contract breach, etc) resulting from failure or security lapse of the particular VM. A risk associated with system 100 as a whole may also be calculated, e.g., as a sum of the risks for all the managed VMs. Although references are made specifically to risk-managed VMs, it should be recognized that other risk-managed components may additionally be managed using risk orchestrator 106.

A particular service may be spread across a plurality of VMs and yet be risk-managed as a single component of the system. In this case, the service may have a risk that is the sum of the VMs on which it relies in a manner similar to the system risk.

In one embodiment, risk orchestrator 106 continually or periodically reviews risks associated with each risk-managed component (e.g., VM) and performs "constant balancing" to reduce the risks associated with risk-managed components having the highest associated risks as well as manage overall risk to the system. For VMs at the highest risk, available and configured mitigation control actions (MCAs) are evaluated, and if the MCA reduces risk, then the MCA may be carried out. Risk orchestrator 106 provides a comprehensive view to the user (e.g., via a graphical user interface accessed by a web browser over network 112) showing, e.g., each threat group, current risk to each risk-managed virtual machine and the system as a whole, and any current or recent MCAs that have been or are being carried out.

In one embodiment, the risk associated with each risk-managed VM is compared with a global threshold that may be selected by an administrator or according to a policy. If a VM has an associated risk that exceeds the threshold, then available and configured MCAs are to determine if the risk can be reduced. If the risk can be reduced, the "best" MCA is carried out. Some MCAs may require assistance of virtual infrastructure manager 110, in which case, risk orchestrator 106 sends a request to virtual infrastructure manager 110, which then carries out the MCA by instructing the relevant one(s) of hosts 102.

Examples of MCAs include, but are not limited to, (1) migration or live migration of a VM from a current host to a target host, (2) save a snapshot of the VM, (3) suspend the VM, (4) power down the VM, (5) restart the host, (6) implement high availability, (7) implement disaster recovery protections, and (8) implement a shadow VM to provide fail-over protection.

With regard to exemplary MCAs, it should be understood that risk avoidance is a legitimate strategy when risk associated with a risk-managed component cannot be tolerated. For example, a particular risk managed component may be responsible for a critical service which should not be made abruptly unavailable. However, downtime may be acceptable if the machine can be shut down in an ordered and scripted manner. In such an instance, the system administrator may decide that the VM should be shut down if its risk cannot be mitigated by migrating it. In this case, the administrator has decided that in those circumstances, the risk should be avoided rather than tolerated.

Migrating a VM means moving a VM from the current host to a target host. Live migration means moving the VM without significant downtime or interruption in service. For migration or live migration, if the target host has a lower host DTP than the current host, then the risk associated with that VM can be reduced by such migration.

Saving a snapshot of a VM involves check pointing the VM, so that its disk state and system state (memory, processor state, etc.) can be restored, either on the same host or on a different host, and restarted from the current point in execution of the VM. Suspending a VM involves simply de-scheduling the VM. Suspending the VM may be a sensible MCA when taken in connection with other MCAs. For example, you might want to save a snapshot of the VM and suspend it, then restart the host and restore and restart the VM from the saved checkpoint or at a later time, e.g., when the threat has abated.

Powering down the VM involves initiating a power down procedure within the guest operating system. Since VMs do not have a physical power supply, the term "powering down" in reference to VMs involves executing the power down procedure of the guest operating system and then simulating the power off operation of the VM, i.e., releasing physical resources (i.e., memory, etc.) to other VMs running on the host. Modern operating systems have an ordered shut down procedure for closing threads and writing buffered data to disk etc., to prevent loss of data. Shutting down and restarting the host involves suspending or powering down VMs and then physically restarting the host computer system.

High availability may involve provisioning spare host capacity, periodically checkpointing the VM, and monitoring the host to ensure it is functioning. If the host fails to provide a heartbeat or otherwise is determined to go offline, then the VMs are restarted from most recent checkpoint on the spare host capacity, with minimum downtime. Disaster recovery may automatically (or manually) restart an entire data center (or portion thereof) at a remote location by replicating virtual infrastructure at the remote location. A shadow VM may be implemented using VMware® Fault Tolerance from VMware, Inc., in which execution on a primary host of one or more VMs can be shadowed on a second physical host, so that if the primary host fails, the shadow VM executing on the second physical host takes over without noticeable or significant downtime.

In one embodiment, hosts are organized into threat groups. Each threat group includes hosts that are similarly situated such that, with respect to a particular threat, the hosts in the threat group are similarly vulnerable. Threat groups may overlap, so that each host may belong to a plurality of threat groups depending on its physical location or configuration. For example, all the hosts on the bottom rack in a particular room may be assigned to a threat group since they are vulnerable to water (e.g., as may be caused by a burst pipe or malfunctioning air conditioning system). The same hosts, along with all the other hosts in a room, may belong to a different threat group since they are vulnerable to temperature fluctuations in the room.

All known threats and their impact may be combined under one decision making process. Host downtime probabilities can be compared while considering a multitude of threats at the same time. For example, suppose a host is giving an indication of a partial fan failure. While an integrated fail-over solution (e.g., VMware® Fault Tolerance) might try to fail-over the VM to a different host, that different host might have a higher downtime probability. If the second host is in a room experiencing unacceptable humidity levels, an IT risk management solution might override the fail over decision to switch since it compares the DTPs of each host and decide that the fail-over would raise risk rather than lower it.

An impact value is assigned to each risk-managed component to identify the component's importance relative to other components in the system. Using impact values, the relative importance of a system, a set of services, or individual VMs can be weighed in light of business goals on an arbitrary scale. In one embodiment, the impact is an arbitrary value that represents the relative potential damage that would result to an organization, e.g., financial damage, data integrity, reputation, or otherwise, when risk-managed components (VMs, services, or system) experience downtime. Impact allows all parties involved, from the application owners to the IT administrator, to communicate using the same metric without having to know the contents of individual risk-managed VMs. It is enough to agree on the relative importance of risk-managed components in order to set handling priorities when threats arise. The impact can be set arbitrarily, i.e., individually based on administrator's knowledge and experience, or in accordance with some administrative policy (e.g., based on user groups, function, access frequency, etc.).

FIG. 3 shows a flowchart 300 illustrating by way of example a risk assessment procedure for managing risk in an organization using the system described above with reference to FIGS. 1 and 2. The output of the risk assessment helps to identify and apply appropriate controls for reducing or eliminating risk during the risk mitigation process that follows and described below with reference to FIGS. 4A-4C. Although the risk assessment procedure is necessarily presented here in a particular order, those skilled in the art will understand that the steps may be performed in any sensible order.

The risk assessment procedure begins as indicated at start block 301 and proceeds to operation 302 wherein the system is characterized. In particular, the boundaries of the system are identified, along with the resources and information that constitute the system. In this operation, the scope of the risk assessment process is defined, as well as the essential information for defining the risk. In one embodiment, the method allows administrators to identify the services, corresponding virtual machines, and corresponding hosts which make up the IT system, or portion thereof being risk-managed.

In operation 304, all known threat sources are identified. A threat is the potential for a threat-source to cause downtime in a host or VM by virtue of the threat source's ability to exercise a vulnerability of the host or VM. An example may be a water pipe that passes through a room having computer equipment. The water pipe could burst, putting all the computers nearby or along the floor of the room off line. Since the water pipe can potentially spray water on nearby computer systems and flood the room, and the computer systems are vulnerable to moisture, the water pipe is capable of exercising the computers' vulnerability to moisture and therefore poses a threat to the computers. Thus, a threat is the potential for a particular threat-source to successfully exercise a particular weakness (vulnerability) which can be accidentally or intentionally exploited.

In operation 306, vulnerabilities to the system characterized in operation 302 are identified. A vulnerability is a weakness or susceptibility to a threat source. Computers (hosts, e.g.) are generally known and understood to be vulnerable to extreme temperatures, moisture, physical damage, hackers, failure of network connectivity, power fluctuations or disruption, etc. Additional vulnerabilities may be present based on the physical environment of the host which may be analyzed to identify all ascertainable vulnerabilities. In one embodiment, the method allows the administrators to include any number of threat sources, as identified by their indications, to be tracked as part of the risk orchestrator's ongoing risk assessment.

In one embodiment, threat groups may be defined that aggregate system components potentially affected by the same threat sources. The likelihood that a specific threat will result in downtime and other considerations may be factored into a conversion between threat source values and down time probability for vulnerable components, as described below with reference to operation 310. The conversion may be thought of as a mapping from a status of a particular threat to a corresponding downtime probability of hosts in the threat group associated with the threat.

In operation 308, appropriate or available mitigation control actions (MCAs) are identified in order to minimize or eliminate the likelihood that a threat will exercise the vulnerabilities identified in operation 406. In one embodiment, the administrator predefines a selection of MCAs that risk orchestrator 106 can choose from in the later risk mitigation stages. A set of rules or recommendations for actions to mitigate the risk are configured. The rules may be implemented globally, for each threat group, or individual risk-managed components. The rules may, for example, preferentially implement available and configured MCAs for maximum risk reduction, or alternatively for sufficient risk reduction with minimum cost or disturbance to the system.

In operation 310, the probability scale is defined as well as the transformation from particular threat statuses to a position on the probability scale. In one embodiment, the probability scale extends from zero, representing no likelihood of downtime (or compromise of data) to one, indicating a strong likelihood of system downtime (or compromise of data). The likelihood determination takes into account the threats identified, the nature of the system's vulnerabilities, and the existence and effectiveness of current controls. Common methods for deriving likelihood include, but are not limited to, Event Tree Analysis (ETA), Fault Tree Analysis (FTA) and Failure Modes and Effects Analysis (FMEA). These analysis methods are well understood in the field of risk management.

In operation 312, an adverse impact magnitude scale is defined using qualitative or quantitative values. Adverse impact values for each of the risk-managed components are also determined. As mentioned previously, the impact is a measure of the importance of the component (host, VM, service, or system) in terms of the damage to the organization that would result if the component fails or is compromised in some way. In one embodiment, administrators define the scale's units, minimum and maximum values, and levels on that scale.

Once the above operations are performed, the resulting information, including how to translate threat source indicator output into downtime probabilities, impact values corresponding to risk-managed components, risk thresholds or target risks, mitigation control action rules, etc., are entered into risk orchestrator 106, which accordingly implements the established IT risk management strategy as described below. The procedure then ends as indicated by done block 314.

Figure 4B:
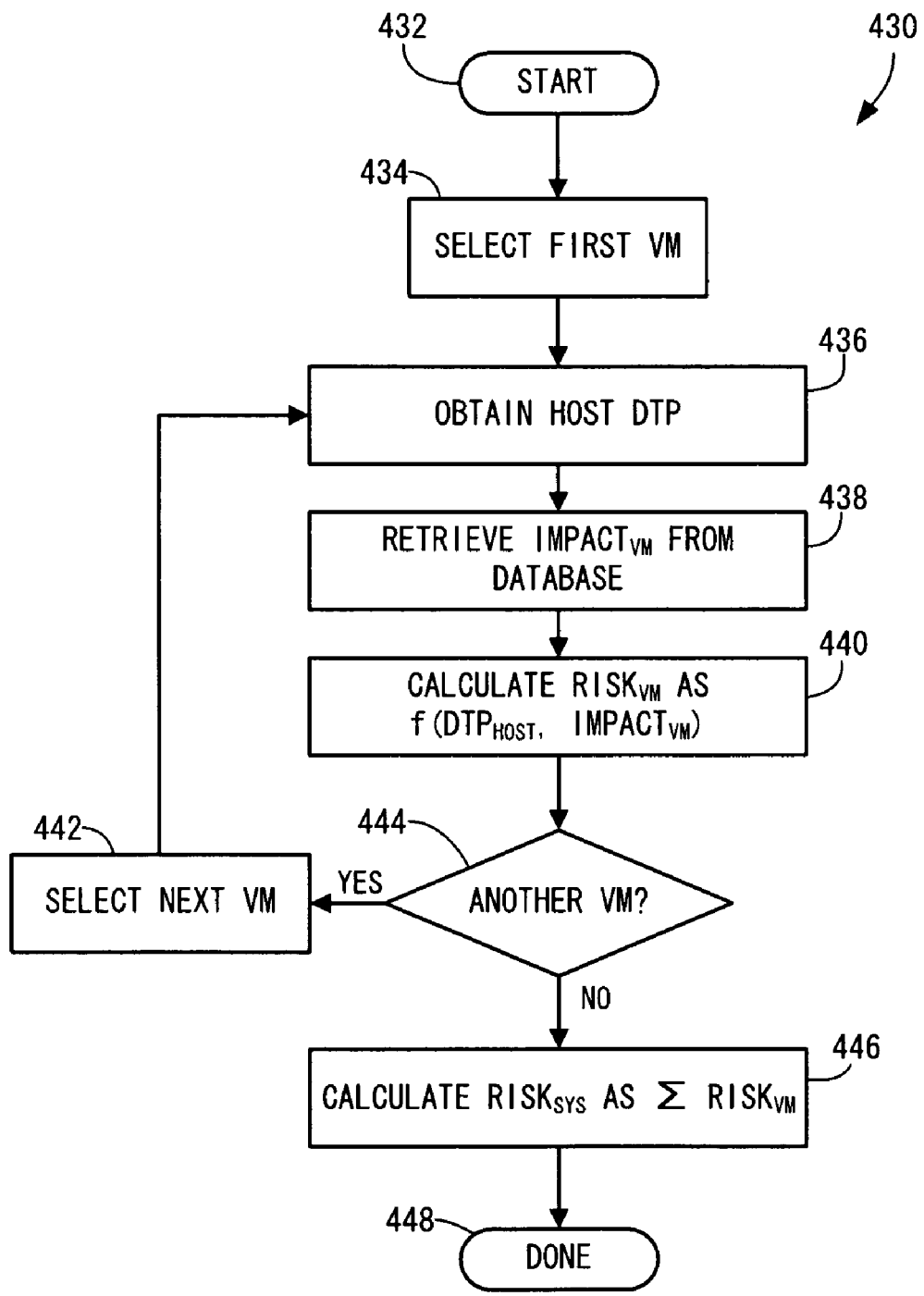
Figure 4C:
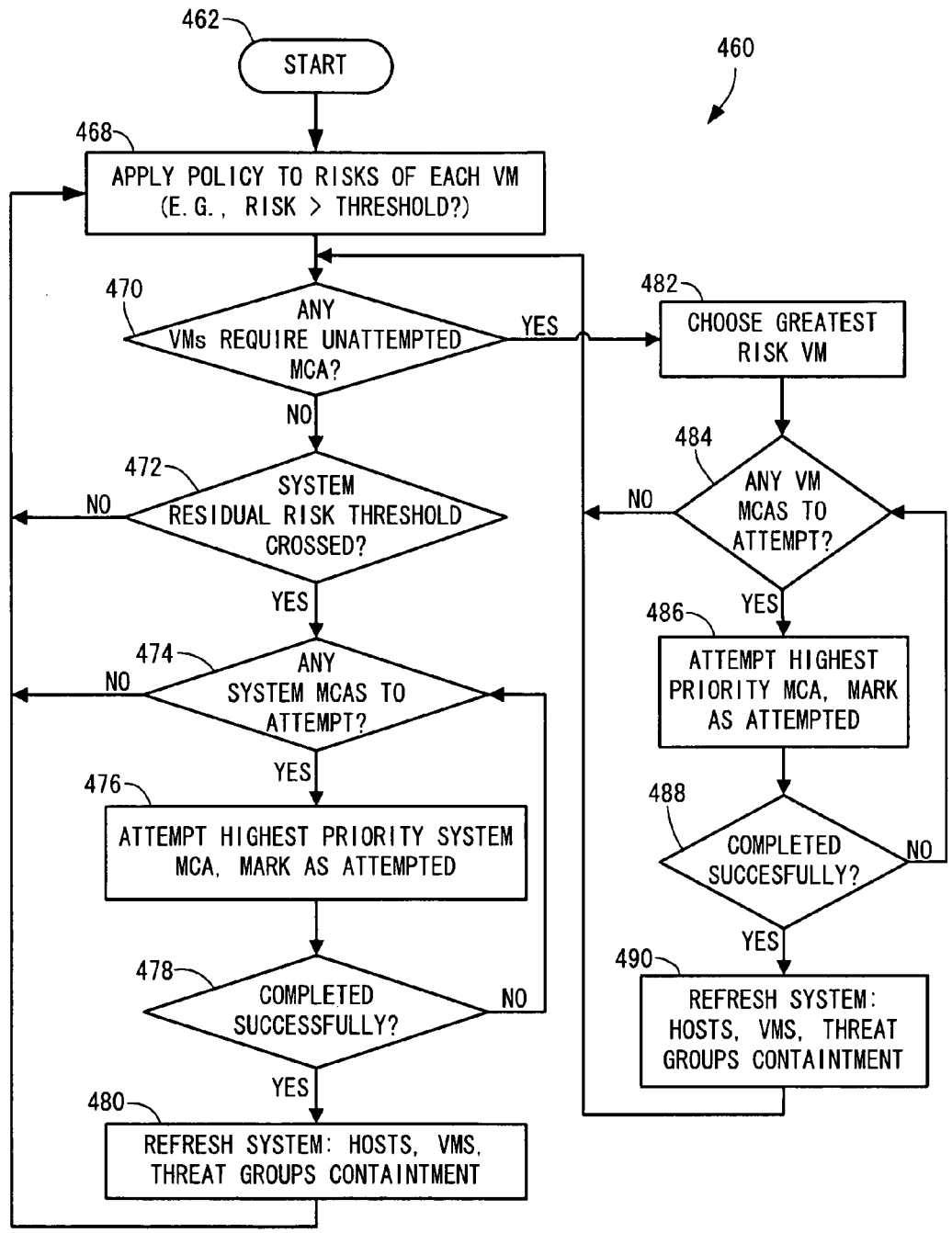

FIGS. 4A, 4B, and 4C illustrate, by way of example, procedures that may be implemented by risk orchestrator 106 (FIGS. 1, 2) for mitigating risk to risk-managed components of system 100.

FIG. 4A is directed to an illustrative method for calculating host downtime probability (DTP). The procedure begins as indicated by start block 402 and proceeds to operation 404 wherein a threat indication message is received. In one embodiment, threat indication messages are formatted XML messages that are received over HTTP or HTTPS using a web services interface. FIGS. 5A and 5B show exemplary threat indication messages 510, 520 formatted in XML. Each threat indication message includes a unique identifier or descriptive label for a specific threat. In FIG. 5A, for example, the threat indicator is labeled "TIND_T_L1" which may, for example, refer to a temperature sensor ("T") in a room ("LAB 1"). In addition, the threat indication message will provide a value. For the TIM represented in FIG. 5A, the value is 78, which identifies the temperature in degrees Fahrenheit (equivalent to 26 degrees Celsius). Dampening and filter logic can be used to limit the amount of TIMs processed over a period of time. Dampening prevents processing massive amounts of TIMs all related to the same threat source over a relatively short period of time. Filtering may be used to prevent singular and temporary values being reported (spikes) that should not be acted upon.

Returning to FIG. 4A, after operation 404, the procedure flows to operation 406, wherein a threat group table is accessed to identify a threat group and conversion method. The threat group table may be maintained in database 90 (FIGS. 1, 2). In one embodiment, each TIND is assigned to a single corresponding threat group. Furthermore, multiple TINDs can be assigned for a specific threat, for example, to provide redundant threat indicators and accordingly enhance the reliability of the TINDs. Table 1 illustrates, by way of example, a threat group table for hosts in several rooms and different sensors. Table 1 will be discussed in more detail with reference to FIG. 6, below.

After operation 406, in accordance with operation 408, the conversion method retrieved from the threat group table is applied to the TIM received in operation 404 to obtain a downtime probability to be applied to the hosts in the threat group. The downtime probability (DTP) is a value that represents a likelihood that a given host will fail as a result of a given threat. A DTP conversion method is a method that converts a TIND value received at the risk orchestrator into a downtime probability value in accordance with the risk orchestrator's probability scale. Each threat group has a downtime conversion method for each of its associated TINDs. The conversion method may be any arbitrary algorithm encoded using a script or other encoding method. The conversion methods may be created or modified by the system administrators and may be implemented as logic and/or rules that embody the knowledge that the system administrator has of when and why the entire system and its individual parts may experience downtime. Empirical evidence may additionally be used to establish DTPs corresponding to specific threat statuses. In one embodiment, each conversion method may be written by a system administrator and "plugged in" to risk orchestrator 106. A library of conversion methods may be created or provided allowing the administrator/user to simply select an appropriate conversion method for a particular threat indicator/threat group.

After obtaining the downtime probability for each host affected by a specific threat indication (i.e., hosts in the corresponding threat group), the procedure flows to operation 410. In operation 410, the host DTP table is updated with the DTP obtained in operation 408.

Any threat source separately exercises a host vulnerability, potentially resulting in downtime of the host. However, each host may be subject to a plurality of threats, and the downtime probability determined in operation 408 is only the downtime probability resulting from the one threat identified in the TIM received in operation 404. In operation 412, for each host, a "host DTP" is calculated from the individual DTPs entered into the host DTP table for that host. In one embodiment, the formula applied is reflected in Equation 1:

$$DTP_{HOST}=1-\Pi_{i=1\ldots n}(1-DTP_{TINDi}) \quad \text{(Eq. 1)}$$

In Equation 1, $DTP_{HOST}$ is the downtime probability for the host, and $DTP_{TINDi}$ is the downtime probability resulting from threat indicator i. Equation 1 may be expanded to:

$$DTP_{HOST}=1-(1-DTP_{TIND1})(1-DTP_{TIND2})\ldots(1-DTP_{TINDn}) \quad \text{(Eq. 2)}$$

After updating the DTP table with host DTPs resulting from all the threats against each host, the procedure ends as indicated in operation 414. As can be seen, each threat results in a corresponding DTP for each host in the threat group corresponding to the threat. The hosts in the threat group may belong to differing threat groups, so each host can have a unique host DTP, which is a combination of all the DTPs for that host. The method shown in flowchart 400 resolves incoming threat indication messages to DTPs, which are then combined with other DTPs for each host to obtain the host DTP, and which is maintained in a DTP table in database 90 (FIGS. 1, 2).

FIG. 4B shows flowchart 430, which illustrates by way of example a procedure for identifying the risk to each risk-managed component. It should be noted that in the present example, the managed components are virtual machines, but risks for other components such as services (which might rely on a plurality of virtual machines or combinations of virtual machines and other components), hosts, etc., may be similarly calculated. The procedure begins as indicated by start block 432 and proceeds to operation 434 wherein a first risk-managed VM is identified for which operations 436-440 are carried out.

In operation 436, the host DTP for the current VM (i.e., the host DTP associated with the host on which the current VM is executing) is retrieved from the DTP table. Then in operation 438, the impact associated with the current VM is retrieved from database 90. As discussed above with reference to FIG. 3, the impact of each VM is an indication of the relative importance of the VM to the organization, and is configured according to a policy or manually by a system administrator. The procedure then flows to operation 440 wherein the risk for each VM is calculated as a function of the host DTP and the impact. In one embodiment, the risk is simply the product of host DTP and impact as shown by Equation 3, although the result may be normalized or scaled in various ways as would occur to those of ordinary skill in the art.

$$Risk_{VM}=Host\ DTP \times Impact_{VM} \quad \text{(Eq. 3)}$$

After operation 440, the procedure flows to operation 444 wherein it is determined whether any remaining risk-managed VMs for which an associated risk has yet to be calculated. If so, the procedure flows to operation 442, wherein the next risk-managed VM is selected, and the procedure returns to operation 436. Once all the risks risk-managed VMs have their corresponding associated risks calculated, the procedure flows to operation 446.

In operation 446 the system risk is calculated. In one embodiment, the system risk is the sum of the risks associated with each of the risk-managed VMs as shown in Equation 3:

$$Risk_{SYS}=\Sigma_{i=1\ldots n}(Risk_{VMi}) \quad \text{(Eq. 4)}$$

The term "system risk" should be understood to refer to the risk to the organization posed by the IT system in its current state with respect to all threats. After the system risk ($Risk_{SYS}$) is calculated, the procedure then ends as indicated by done block 448. A risk value associated with a service relying on a plurality of VMs may be calculated similarly to the system risk, except only the subset of VMs associated with the service is included in the calculation. MCAs may then be separately configured for each service. Although host DTP is calculated in the above method, it is also possible of course to substitute the equation for host DTP (Equation 1) in Equation 3 above to directly obtain:

$$Risk_{VM}=Impact_{VM}(1-\Pi_{i=1\ldots n}(1-DTP_{TINDi})) \quad \text{(Eq. 5)}$$

FIG. 4C shows a flowchart 460 illustrating by way of example a method for mitigating risk to risk-managed components, once the risk has been calculated as described above with respect to FIG. 4B. Those skilled in the art will understand that no IT system is risk free, and not all implemented controls can completely eliminate the risk they are intended to address. Residual risk is an important metric in the IT risk management process. Residual risk may be agreed upon by the appropriate stake holders in the organization. Responsibility is taken for the agreed upon residual value before an IT system can become operational. While possible, mitigation actions should continue until risk levels drop below the agreed residual upon level.

As described above, a mitigation control action (MCA) is an action that can be applied to virtual machine, a group of virtual machines (virtual service), hosts, or the system in order to attempt to reduce the risk associated with risk-managed components. Risk orchestrator 106 (FIGS. 1, 2) may maintain a global list of MCAs that it can potentially execute to attempt to reduce components' risk. That list may be composed of predefined MCAs, as well as additional custom MCAs created and added by an administrator. The administrator chooses MCAs to apply to virtual machines, hosts, or the entire system based on the risk mitigation strategy. An example configuration shown below in Table 4 is discussed below with reference to FIGS. 5A-5D.

In one embodiment, three different mitigation modes are possible: Automatic, manual and semi-automatic. In automatic mitigation, the administrator-preconfigured MCAs are attempted to mitigate risk to acceptable levels. In manual, mitigation is suggested by the risk orchestrator and an administrator decides which action is required to continue with MCAs. In semi-automatic mitigation, the method operates in manual for a predetermined configurable period of time. If after this period there is no administrator decision, then the system switches to the automatic mode.

While in automatic, the method has two options for attempting to apply MCAs to identified virtual machines for action: serial and parallel. While in the serial option, the predefined MCAs are applied for the highest risk VM and then the method proceeds to the next VM only when an MCA have been successfully applied or when all MCAs have failed. The risk orchestrator can recalculate risk assessment after each MCA is taken. When using the parallel option, the predefined MCAs deemed necessary for risk mitigation are initiated and carried out concurrently.

In addition, in one embodiment, there may be two basic mitigation strategies: threshold-based and constant balancing. In the threshold-based mitigation, an MCA may be taken (if available) when predefined risk thresholds have been crossed. When using constant-balancing mitigation, risk is constantly being balanced to achieve the minimum risk possible for the virtual machines and the system at any point in time.

The procedure illustrated in FIG. 4C begins as indicated by start block 462 and proceeds to operation 468, wherein an appropriate policy as described above is applied to the risk-managed components of the system. For example, a threshold-based approach identifies whether any VMs (or other risk-managed component) has an associated risk that exceeds a threshold risk. The threshold risk may be a global threshold since the risks values associated with each managed component already takes into consideration the differing adverse impacts that would result from failure of the risk-managed component. If the policy is constant-balanced risk, then they system may simply identify the managed component having the highest associated risk value and apply risk mitigation to that component.

In operation 470, it is determined whether any VMs require risk mitigation according to the policy applied in operation 468. If not, then the procedure flows to operation 472 to determine if the system residual risk ($RISK_{SYS}$) has crossed a system risk threshold. The system risk may be calculated using Equation 4 as previously explained. If yes, then the method continues to operation 474, otherwise the procedure returns to operation 468.

In operation 474, it is determined whether there are any available system MCAs to be attempted. An available system MCA may be an MCA that was previously configured for mitigating risk associated with the system as a whole, that has not yet been attempted, is likely to be successful, and would reduce the risk to the system or amount of downtime if successful. If an available MCA exists, then the procedure continues to operation 476 wherein the method attempts the available MCA with the highest associated priority and marks that MCA as attempted. The procedure then flows to operation 478, wherein it is determined whether the MCA attempted in operation 476 was successful. If the MCA was not successful, the procedure returns to operation 474 wherein it is determined whether another MCA is available. If the MCA was successfully completed, then the procedure proceeds to operation 480, wherein the risk measurements are refreshed or recalculated, including those related to hosts, VMs, and threat groups. After operation 480, the procedure returns to operation 468.

Referring now to the right side of FIG. 4C, when there are VMs that require an MCA, the procedure flows from operation 470 to operation 482, wherein the VM with the greatest associated risk is identified and selected. The procedure then flows to operation 484 wherein it is determined whether there are any available VM MCAs to attempt, in which case the method continues to operation 486. If there are no available MCA, the procedure returns to operation 470 or 472. An available MCA for the current VM is an MCA that has not yet been attempted, that would reduce the VM's associated risk, and is likely to succeed. For example, if the MCA is migrating the VM to a target host, the MCA is not available if there are no target hosts available with a lower DTP. In operation 486, the system attempts the highest priority MCA and marks the MCA as attempted.

The selection as to what MCA to perform or how a particular MCA is carried out (e.g., which target to send the VM) may be made in various ways. In one embodiment, a cost-benefit analysis is performed. For example, the cost or disturbance involved in implementing an particular MCA a particular way can be identified. Costs can be quantified in terms of such things as network bandwidth, storage impacts, and processor loads. It may "cost less" to migrate a VM to a nearby host that has lower CPU utilization and plenty of spare storage than to a host that is far away, and has higher CPU utilization and storage utilization that is near its capacity. Likewise, live-migrating a VM to a host that is more fully utilized or has more VMs running on it, may cause a disturbance to those VMs than to another host having fewer running VMs.

The benefit of migrating a VM includes reducing its associated risk. However, other benefits may also be considered as part of the equation when performing the cost-benefit analysis. For example, if a particular VM frequently accesses a particular resource, such as a data server or storage device, there may be a benefit to keeping or moving the particular VM near (i.e., at a host having the shortest network path to) the resource to reduce latency and load on routers and switches.

Thus in operation 486, a number of policy considerations may play a role in which MCA to perform and how it should be carried out. The administrator may choose to emphasize reduction in risk, in which case the MCA having the greatest risk reduction would be selected. Thus, when selecting a target host for migrating a VM, the host having the lowest downtime probability may be selected. However, it is also possible, and in one embodiment preferred, to identify all hosts with a sufficiently low downtime probability to bring the risk associated with the VM below the threshold, and then from among those hosts, select the host having the lowest cost or disturbance to the system.

After the selected MCA is carried out in operation 486, the procedure flows to operation 488 wherein it is determined whether the MCA attempted in operation 486 completed successfully. If so, then the procedure continues to operation 490. Otherwise, the procedure returns to operation 484. In operation 490, the risk measurements are refreshed or recalculated, including those related to hosts, VMs, and threat groups. Then the procedure returns to operation 470 or, alternatively, 468.

FIGS. 5A and 5B illustrate exemplary threat indication messages (TIMs) 510, 520. In one embodiment, TIMs are formatted using extensible markup language (XML) to provide useful information about a corresponding threat but without limiting the information capable of being conveyed. Once the TIM is generated, it can be transmitted over a network connection using the HTTP/S protocols as described above with reference to FIG. 2.

Risk orchestrator 106 (FIGS. 1, 2) may be configured to recognize specific TINDs, and will not process values sent from any other sources. The threat value being sent in the TIM is sent in units understandable by the threat group's DTP conversion methods described above with reference to FIG. 2 and shown by way of example in Table 1. Referring to FIG. 5A, each TIM may include a unique identifier 512 that will enable the mechanism to uniquely identify the TIND, a threat indication value 513, the type of value 514 being sent, a description of the units 516 in which the value is delineated, and additional data 518 regarding the TIND itself, the event that triggered the message, and the contents of the message.

EXAMPLE

This example will demonstrate how a variety of unrelated threats to information technology, previously separately and independently managed by disparate groups or individuals in a particular organization, are combined under one decision making process to enhance data availability, data security, and data integrity.

Figure 6A:
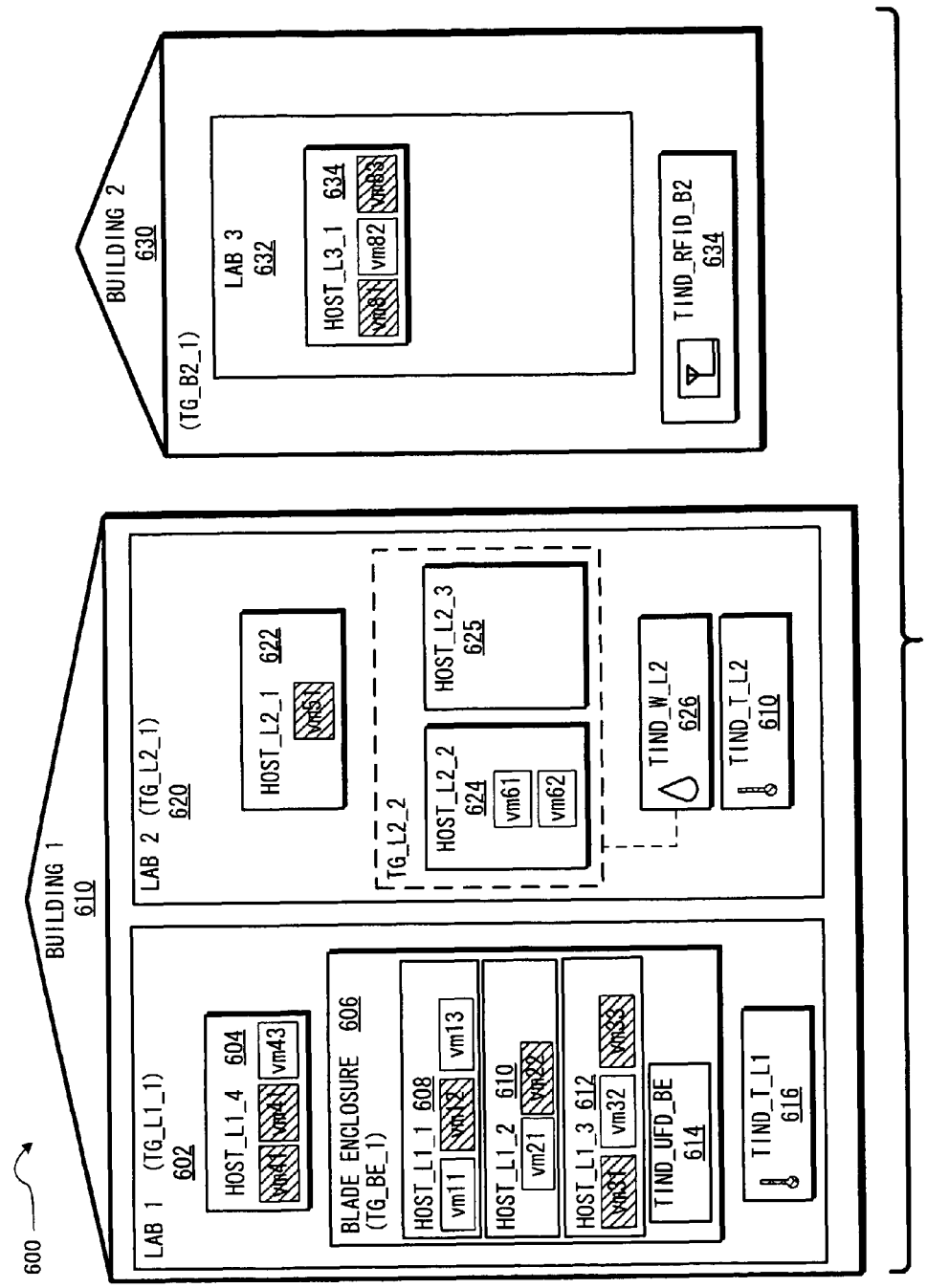
FIGS. 6A, 6B, 6C, and 6D schematically illustrate by way of example a computer network system that is spread out among several rooms and risk mitigation operations therefor.

FIG. 6A schematically illustrates by way of example system 600, which is spread out among several rooms 602, 620, 632, labeled "LAB 1," "LAB 2," and "LAB 3," respectively, which are located in building 610 (labeled "BUILDING 1") and building 630 (labeled "BUILDING 2"). Room 602 houses host 604 and blade enclosure 606, which in turn contains hosts 608, 610, 612. Room 620 includes hosts 622, 624, 625. Building 630 includes room 632 ("LAB 3") which contains host 634. Each host belongs to one or more threat groups which are listed in Table 1, along with corresponding TINDs and "conversion methods" which are described below. The hosts are each identified by a unique descriptive labels, which are also listed in Table 1.

Different VMs are executing on the different servers, such as vm41, vm12, vm62, vm82, etc. VMs which are not being risk-managed are shaded in FIG. 6. The hosts of FIG. 6 are interconnected via a network (not shown), so VMs can be migrated to a different host if needed. Table 2 lists the risk-managed VMs in computer network system 600 and associated host at an initial time. It should be noted that although not all VMs shown in FIG. 6 are risk-managed, it does not follow that there is no risk that they could fail. It simply means that the administrator decided (for whatever reason) not to risk-manage those components.

TABLE 2

| Host | Descriptive Label | Risk-managed VMs |
|---|---|---|
| Host 608 | "HOST_L1_1" | vm11, vm13 |
| Host 610 | "HOST_L1_2" | vm21 |
| Host 612 | "HOST_L1_3" | vm32 |
| Host 604 | "HOST_L1_4" | vm43 |
| Host 622 | "HOST_L2_1" | (none) |
| Host 624 | "HOST_L2_2" | vm61, vm62 |
| Host 625 | "HOST_L2_3" | (none) |
| Host 632 | "HOST_L3_1" | vm82 |

Each host may have any number of threats to which they are vulnerable, but for simplicity this example only contemplates the following threats: All hosts in room 602 are vulnerable to the temperature in that room, which is indicated by TIND 616; all hosts in room 620 are vulnerable to the temperature in that room, which is indicated by TIND 610; all hosts in blade enclosure 606 are vulnerable to a port malfunction indicated by TIND 614; hosts 624, 625 are located on the bottom rack in room 620 and are vulnerable to water in that room, which is indicated by TIND 626; and finally, all hosts in building 630 are vulnerable to unauthorized access indicated by radio frequency identifier (RFID) reader and/or motion sensor TIND 634. Referring to Table 1, it can be seen that each threat indicator has a corresponding threat group to which one or more hosts belong.

Table 3 is a VM impact table holding impact values assigned to each risk-managed VM by the administrator or according to a policy. The virtual machine impact scale is an agreed upon scale, that may be divided into different ranges, used by the administrator to assign impact values or levels to virtual machines in the system being managed. In one embodiment, the VM impact scale includes a continuous range scale of impact values with a configurable minimum impact value, a configurable maximum impact value, configurable unit types and unit intervals, and configurable non-overlapping levels (ranges) within the scale. In one embodi-

TABLE 1

| Threat Indicator Label | Threat Group | Threat Group Description | Hosts in TG | Conversion Method |
|---|---|---|---|---|
| TIND 606 "TIND_T_L1" | TG_L1_1 | Temperature in "LAB 1" | 608 ("HOST_L1_1") 610 ("HOST_L1_2") 612 ("HOST_L1_3") 604 ("HOST_L1_4") | RangeLinear(65,105) |
| TIND 614 "TIND_UFD_BE" | TG_BE_1 | Uplink failure in "BLADE ENCLOSURE" | 608 ("HOST_L1_1") 610 ("HOST_L1_2") 612 ("HOST_L1_3") | customOnePortLeft( ){   Let f=extract TIM failed ports   Let v = 6 − f   Return booleanMatch(v,1) } |
| TIND 610 "TIND_T_L2" | TG_L2_1 | Temperature in "LAB 2" | 622 ("HOST_L2_1") 624 ("HOST_L2_2") 625 ("HOST_L2_3") | RangeLinear(65,105) |
| TIND 626 "TIND_W_L2" | TG_L2_2 | Water in "LAB 2," threatens bottom rack | 624 ("HOST_L2_2") 625 ("HOST_L2_3") | Any |
| TIND 634 "TIND_RFID_B2" | TG_B2_1 | Unauthorized access in "BUILDING 2" | 634 ("HOST_L3_1") | booleanMatch(v,1){ } | ment, the impact scale is from zero (0) to 100, with zero to ten being "Low," 11 to 50 being "Medium" and 51 to 100 being "High." The ranges low, medium, and high, may be displayed graphically, e.g., using color coding, on a sliding scale, to assist in consistently assigning appropriate impact values to VMs over the course of time and by multiple users (administrators).

TABLE 3

| VM | Impact ($I_{vm}$) |
|---|---|
| vm11 | 100 (high) |
| vm13 | 54 (high) |
| vm21 | 50 (medium) |
| vm32 | 5 (low) |
| vm43 | 100 (high) |
| vm61 | 25 (medium) |
| vm62 | 10 (low) |
| vm82 | 100 (high) |

Table 4 shows a table indicating MCA actions configured for each risk-managed VM in system 600. In this example, all the VMs are compared against a global threshold of 50, so that if any of the VMs have a risk exceeding that value, then the corresponding configured actions can be carried out for that VM. Note that it is also possible for each VM to be compared against a specified threshold (although this generally is not necessary since the VMs are already assigned a unique impact value, which accommodates differences in the VMs' relative importance). Risk and impact are related to each other as described above with reference to Equation 3. Since host DTP is expressed as a value from zero to one, the risk and impact scales are coincident such that the minimum and maximum risks coincide with minimum and maximum impacts of the selected impact scale. However, it should also be recognized that it is possible to express downtime probability in ranges other than from zero to one. In this case, the minimum risk would be the minimum DTP times the minimum impact and the maximum risk would be the maximum DTP times the maximum impact.

For DTP ranges from zero to one, the maximum possible system risk is the sum of the impact values since at maximum risk, each host DTP will be equal to one "1". In the present example, the system risk threshold is set to 70% so that if the sum of the risks of the managed components exceeds 70% of the maximum possible risk of the system, then the configured MCAs for the system will be carried out or attempted. Referring to Table 3, the sum of all configured impacts is 444, so the system threshold will be 70% of 444, which is 311.

TABLE 4

| Managed Component(s) | Threshold | Configured Actions |
|---|---|---|
| vm11, vm13, vm21, vm32, vm43, vm61, vm62, vm82 | Risk > 50 | 1. Live migrate to another host; perform next MCA if migration fails<br>2. Snapshot VM |
| System | Risk > 70%<br>i.e., >70% of max risk<br>>0.7 × 444<br>>311 | 1. Snapshot VMs; perform next MCA;<br>2. Implement disaster recovery; protection and switch to 2$^{nd}$ site, perform next MCA;<br>3. Shut down all hosts |

The MCA execution order is prioritized in Table 4. It should be noted that not all MCAs are applicable all the time for all risk-managed components. In the example shown in Table 4, all the VMs have two possible actions: (1) to perform a VMotion (VM migration), and (2) to take a snapshot of the VM. Although not shown here, it is possible to configure different MCAs for the VMs.

The present example will include the series of unfortunate events listed in Table 5.

TABLE 5

| Event | Description |
|---|---|
| 1 | Temperature in "Lab 1" rises to 85° F. (29° C.) |
| 2 | Only one uplink port in blade enclosure functioning correctly |
| 3 | Unauthorized access detected in "Building 2" |
| 4 | Water detected on floor of "Lab 2" |

Event 1: Lab 1 Temperature Increases

At event 1, TIND 616 (FIG. 6A) records a temperature of 85 degrees and transmits this information, either directly or via TIM converter 85, to risk orchestrator 106 (FIGS. 1, 2). The TIM may be similar to the one shown in FIG. 5A, but indicating a temperature of 85 degrees instead of 78 degrees (29° C. instead of 26° C.). Risk orchestrator 106 accesses threat group table (Table 1) and converts the temperature 85 to a downtime probability of 0.5, since 85 is exactly half way in the configured range of 65-105, and the range is configured to be related linearly, which is as indicated in Table 1 for TIND 616.

Table 6 shows a DTP table, which is updated to reflect the new DTP=0.5 for each host belonging to the threat group associated with TIND 616. The resulting host DTPs are calculated using Equation 1 and are also indicated in Table 6.

TABLE 6

| Host | TIND | Resulting DTP |
|---|---|---|
| Host 608 ("HOST_L1_1") | TIND 606 ("TIND_T_1")<br>TIND 614 ("TIND_UFD_BE") | 0.50<br>0.00<br>Host DTP = 0.50 |
| Host 610 ("HOST_L1_2") | TIND 606 ("TIND_T_1")<br>TIND 614 ("TIND_UFD_BE") | 0.50<br>0.00<br>Host DTP = 0.50 |
| Host 612 ("HOST_L1_3") | TIND 606 ("TIND_T_1")<br>TIND 614 ("TIND_UFD_BE") | 0.50<br>0.00<br>Host DTP = 0.50 |
| Host 604 ("HOST_L1_4") | TIND 606 ("TIND_T_1") | 0.50<br>Host DTP = 0.50 |
| Host 622 ("HOST_L2_1") | TIND 610 ("TIND_T_L2") | 0.00<br>Host DTP = 0.00 |
| Host 624 ("HOST_L2_2") | TIND 610 ("TIND_T_L2")<br>TIND 626 ("TIND_W_L2") | 0.00<br>0.00<br>Host DTP = 0.00 |
| Host 625 ("HOST_L2_3") | TIND 610 ("TIND_T_L2")<br>TIND 626 ("TIND_W_L2") | 0.00<br>0.00<br>Host DTP = 0.00 |
| Host 632 ("HOST_L3_1") | TIND 634 (""TIND_RFID_B2") | 0.00<br>Host DTP = 0.00 |

After determining each host's host DTP, the risks associated with each individual VM may be determined as shown in Table 7, which is a risk table for computer network system 600. Since none of VMs have an associated risk in excess of the threshold set in Table 4, risk is considered to be at an acceptable level and no MCAs need to be taken at this time.

TABLE 7

| Host | VM | Impact$_{VM}$ | Host DTP | Risk |
|---|---|---|---|---|
| Host 608 ("HOST_L1_1") | vm11 | 100 | 0.5 | 50 |
| | vm13 | 54 | 0.5 | 27 |

TABLE 7-continued

| Host | VM | Impact$_{VM}$ | Host DTP | Risk |
|---|---|---|---|---|
| Host 610 ("HOST_L1_2") | vm21 | 50 | 0.5 | 25 |
| Host 612 ("HOST_L1_3") | vm32 | 5 | 0.5 | 2.5 |
| Host 604 ("HOST_L1_4") | vm43 | 100 | 0.5 | 50 |
| Host 622 ("HOST_L2_1") | | | 0.0 | |
| Host 624 ("HOST_L2_2") | vm61 | 25 | 0.0 | 0 |
| | vm62 | 10 | 0.0 | 0 |
| Host 625 ("HOST_L2_3") | | | 0.0 | |
| Host 632 ("HOST_L3_1") | vm82 | 100 | 0.0 | 0 |
| System Risk | | | | 154.5 |

Event 2: Blade Enclosure Uplink Port Failure

As indicated in Table 5, at event 2, TIND 614 reports that five out of six uplink ports are down. Risk orchestrator accesses threat group table (Table 1) and generates an associated downtime probability corresponding to this TIM in accordance with the algorithm provided by the threat group table. In this case, the algorithm determines that when only one uplink port is functioning the DTP is equal to one ("1"). Table 8 shows an updated DTP table containing the resulting downtime probabilities of this event on each of the hosts, where the host DTP values are calculated using Equation 1, and Table 9 shows the updated risk table based on the new host DTP values.

TABLE 8

| Host | TIND | Resulting DTP |
|---|---|---|
| Host 608 ("HOST_L1_1") | TIND 606 ("TIND_T_1") | 0.50 |
| | TIND 614 ("TIND_UFD_BE") | 1.00 |
| | | Host DTP = 1.00 |
| Host 610 ("HOST_L1_2") | TIND 606 ("TIND_T_1") | 0.50 |
| | TIND 614 ("TIND_UFD_BE") | 1.00 |
| | | Host DTP = 1.00 |
| Host 612 ("HOST_L1_3") | TIND 606 ("TIND_T_1") | 0.50 |
| | TIND 614 ("TIND_UFD_BE") | 1.00 |
| | | Host DTP = 1.00 |
| Host 604 ("HOST_L1_4") | TIND 606 ("TIND_T_1") | 0.50 |
| | | Host DTP = 0.50 |
| Host 622 ("HOST_L2_1") | TIND 610 ("TIND_T_L2") | 0.00 |
| | | Host DTP = 0.00 |
| Host 624 ("HOST_L2_2") | TIND 610 ("TIND_T_L2") | 0.00 |
| | TIND 626 ("TIND_W_L2") | 0.00 |
| | | Host DTP = 0.00 |
| Host 625 ("HOST_L2_3") | TIND 610 ("TIND_T_L2") | 0.00 |
| | TIND 626 ("TIND_W_L2") | 0.00 |
| | | Host DTP = 0.00 |
| Host 632 ("HOST_L3_1") | TIND 634 ("TIND_RFID_B2") | 0.00 |
| | | Host DTP = 0.00 |

TABLE 9

| Host | VM | Impact$_{VM}$ | Host DTP | Risk |
|---|---|---|---|---|
| Host 608 ("HOST_L1_1") | vm11 | 100 | 1.0 | 100 |
| | vm13 | 54 | 1.0 | 54 |
| Host 610 ("HOST_L1_2") | vm21 | 50 | 1.0 | 50 |
| Host 612 ("HOST_L1_3") | vm32 | 5 | 1.0 | 5 |
| Host 604 ("HOST_L1_4") | vm43 | 100 | 0.5 | 50 |
| Host 622 ("HOST_L2_1") | | | 0.0 | |
| Host 624 ("HOST_L2_2") | vm61 | 25 | 0.0 | 0 |
| | vm62 | 10 | 0.0 | 0 |
| Host 625 ("HOST_L2_3") | | | 0.0 | |
| Host 632 ("HOST_L3_1") | vm82 | 100 | 0.0 | 0 |
| System Risk | | | | 259 |

Figure 6B:
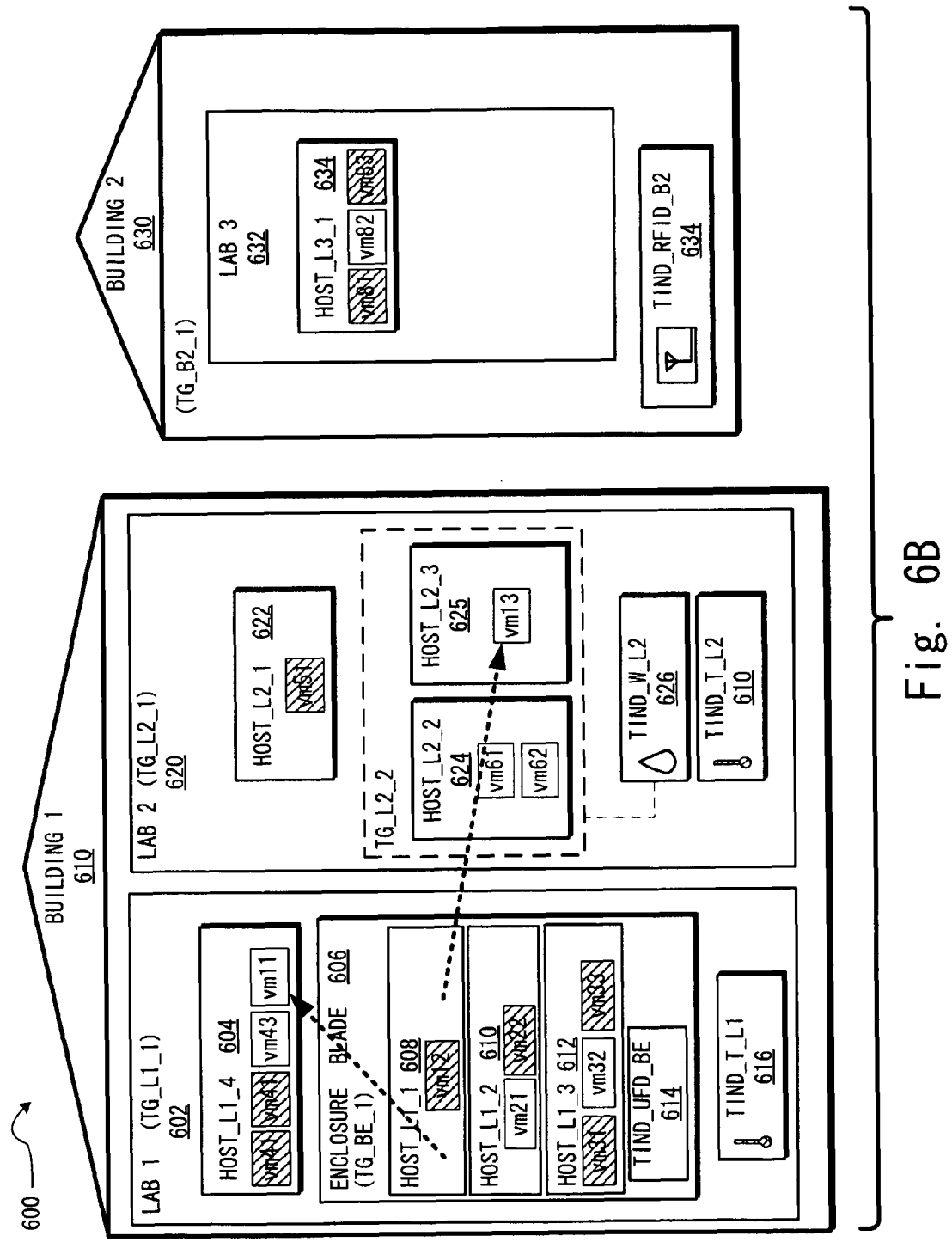

Table 9 is accessed to identify the risk-managed component having the highest associated risk value, and this is compared against the threshold set in Table 4. Risk-managed components vm11 and vm13 have associated risks in excess of the threshold and therefore MCAs configured in Table 4 will be carried out for these risk-managed components. FIG. 6B shows the response of the system to the increased threats. Specifically, the risk orchestrator migrates vm11 and vm13 off host 608 in response to the uplink error.

Risk orchestrator first identifies the risk-managed component with the highest risk, and performs the first configured MCA for that component. Referring to Table 9, it is clear that vm11 has the highest risk and Table 4 indicates the first MCA is live migration. Therefore, the first action is to live-migrate vm11 off the blade enclosure 606. In this example, the policy is to sufficiently reduce risk with minimum disruption or cost to the system. Thus, risk orchestrator 106 identifies potential targets and performs cost/benefit analysis to determine the most appropriate target for the live migration. In this case, moving vm11 to host 604 ("HOST_L1_4") offers sufficient risk mitigation because it lowers vm11's risk below the VM risk threshold value, and because host 604 represents the least cost to migrate (i.e., shortest network path requirements, etc.) since the target host 604 is in the same room. Since the live migration succeeds in lowering VM11's risk below the threshold, all other MCAs defined for it will not be attempted.

After vm11 is migrated, the risk-managed component having the next greatest associated risk is vm13. The system determines to live-migrate vm13 to host 625 in "LAB 2" because live-migration is the first MCA defined for vm13 in Table 4, and because live-migration will reduce the component's risk below the configured threshold value (also in configured in Table 4). This time, the cost-benefit analysis determines that selecting host 625 as the target for live-migration of vm13 creates the least disturbance to system 600, since vm11 is now executing on host 604 and should not be affected and host 625 has no virtual machines running on it. The second MCA listed in Table 4, "Snapshot the VM," is not performed since the first MCA was available and successful.

Risk-managed component vm11 was not transferred out of "LAB 1" even though that meant it is exposed to higher temperature because the risk associated with vm11 was sufficiently reduced to bring it below the threshold. This is a good example of sufficient mitigation rather than optimal mitigation. Additionally, the method could have further reduced system risk by moving vm11 out of the lab, and keeping vm13 in the same lab. This would have achieved the required lowering of VM risk below the threshold, and would have achieved an overall lower system risk. However, the policy is to implement sufficient mitigation, taking into account cost-benefits of the potential migration targets, and follows the guideline of dealing with the greatest risk first. This allows the method to encounter problems related to the greater risks sooner than later. Even though risk-managed components vm21 and vm32 are affected by the blade enclosure port failure, their risk does not require mitigation according to the administrator's definition and the impact they have on the organization. On the other hand, if the system followed a constant balancing strategy then the system would have attempted to reduce risks associated with those VMs as well.

Post mitigation risk assessment holds that the risk associated with vm11 has been reduced from 100 to 50, that the risk associated with vm13 has been reduced from 54 to 0, and finally the system risk has been reduced from 259 to 154 (or 34% of potential system risk), which is less than the threshold value of 70%.

Event 3: Unauthorized Access to Building 2 Detected

As indicated in Table 5, at event 3, TIND 634, comprising a radio frequency identifier (RFID) reader and motion detector in building 630 ("BUILDING 2") have identified a nonauthorized access and sends a TIM (either directly or indirectly) to risk orchestrator 106. Risk orchestrator 106 access the threat group table (Table 1) and generates an associated downtime probability corresponding to the TIM received from TIND 634 according to the algorithm provided by the threat group table. In this case, the algorithm evaluates a "TRUE" value from TIND 634 to a 100% downtime probability of hosts in the threat group. Table 10 shows the resulting DTP table of this (and previous) events on each of the hosts, and host DTPs calculated using Equation 1. Table 11 shows the updated risk table for risk-managed components based on the host DTPs in Table 8 and configured impact values from Table 3.

TABLE 10

| Host | TIND | Resulting DTP |
|---|---|---|
| Host 608 ("HOST_L1_1") | TIND 606 ("TIND_T_1") TIND 614 ("TIND_UFD_BE") | 0.50 1.00 Host DTP = 1.00 |
| Host 610 ("HOST_L1_2") | TIND 606 (""TIND_T_1") TIND 614 ("TIND_UFD_BE") | 0.50 1.00 Host DTP = 1.00 |
| Host 612 ("HOST_L1_3") | TIND 606 (""TIND_T_1") TIND 614 ("TIND_UFD_BE") | 0.50 1.00 Host DTP = 1.00 |
| Host 604 ("HOST_L1_4") | TIND 606 (""TIND_T_1") | 0.50 Host DTP = 0.50 |
| Host 622 ("HOST_L2_1") | TIND 610 ("TIND_T_L2") | 0.00 Host DTP = 0.00 |
| Host 624 ("HOST_L2_2") | TIND 610 ("TIND_T_L2") TIND 626 ("TIND_W_L2") | 0.00 0.00 Host DTP = 0.00 |
| Host 625 ("HOST_L2_3") | TIND 610 ("TIND_T_L2") TIND 626 ("TIND_W_L2") | 0.00 0.00 Host DTP = 0.00 |
| Host 632 ("HOST_L3_1") | TIND 634 (""TIND_RFID_B2") | 1.00 Host DTP = 1.00 |

TABLE 11

| Host | VM | Impact$_{VM}$ | Host DTP | Risk |
|---|---|---|---|---|
| Host 608 ("HOST_L1_1") | | | | |
| Host 610 ("HOST_L1_2") | vm21 | 50 | 1.0 | 50 |
| Host 612 ("HOST_L1_3") | vm32 | 5 | 1.0 | 5 |
| Host 604 ("HOST_L1_4") | vm43 | 100 | 0.5 | 50 |
| | vm11 | 100 | 0.5 | 50 |
| Host 622 ("HOST_L2_1") | | | 0.0 | |
| Host 624 ("HOST_L2_2") | vm61 | 25 | 0.0 | 0 |
| | vm62 | 10 | 0.0 | 0 |
| | | | | 0 |
| Host 625 ("HOST_L2_3") | vm13 | 54 | 0.0 | 0 |
| Host 632 ("HOST_L3_1") | vm82 | 100 | 1.0 | 100 |
| System Risk | | | | 255 |

Figure 6C:
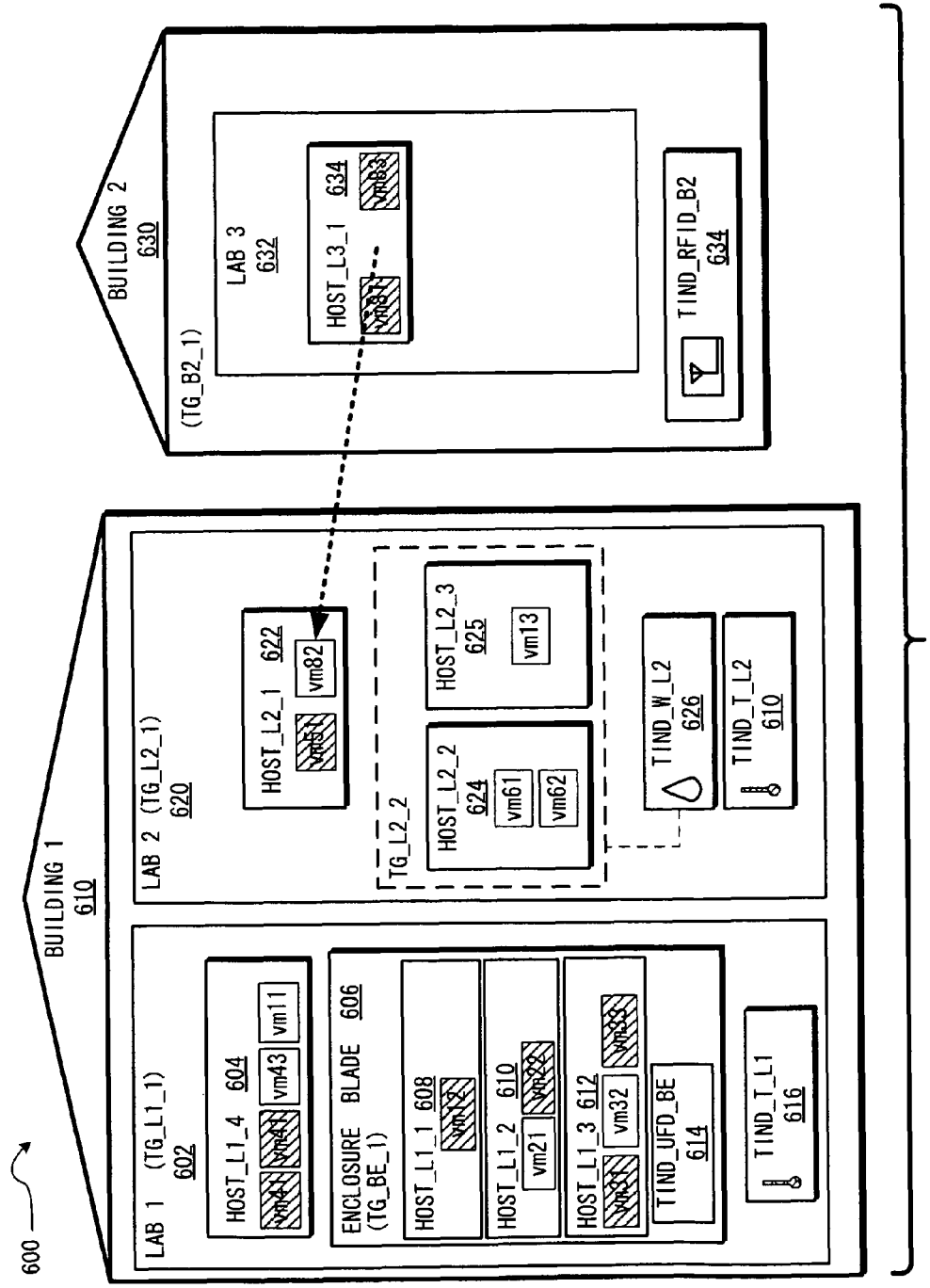

As can be seen from Table 11, vm82 now has a risk of 100, which is higher than the threshold of 50 and as a result, mitigation is required for vm82. In addition, it may be noted that that system risk has not crossed the system threshold or 311 set in Table 4, thus system related mitigation is not required. The risk-managed component having the greatest associated risk is vm82. Live migration is attempted for vm82 in accordance with configured MCA priorities in Table 4. The target hosts which would result in sufficiently reduced risk are all hosts in room 620 ("LAB 2") and host 604 in room 602 ("LAB 1"). The target having the least disturbance is host 622 since it has no risk-managed components on it. Therefore, vm82 is live-migrated to host 622 as shown in FIG. 6C.

While migrating vm82 to host 604 would sufficiently reduce risk to 50, migrating to host 604 would have affected the system more than migrating vm82 to host 622, which is not currently hosting any significant VMs on it (as far as IT risk management is concerned). Post mitigation risk assessment holds that vm82 risk has been reduced from 100 to zero, and that the system risk has been reduced from 255 to 155 (or 34% of potential system risk), which is less than the threshold value of 70%.

Event 4: Water in Room 620 Detected

As indicated in Table 5, at event 4, TIND 626, comprising water sensor in room 620 ("LAB 2" of "BUILDING 1") senses the presence of water and sends a TIM to risk orchestrator 106 indicating water detected. Risk orchestrator 106 access the threat group table (Table 1) and generates an associated downtime probability corresponding to the TIM from TIND 626 according to the algorithm provided by the threat group table. In this case, the algorithm evaluates any value from TIND 626 to a 100% downtime probability of hosts in the threat group. Table 12 shows the updated DTP table for this (and previous) events, where host DTP is calculated using Equation 1. Table 13 shows the updated risk table for risk-managed components based on the host DTP in Table 12 and configured impact values from Table 3.

TABLE 12

| Host | TIND | Resulting DTP |
|---|---|---|
| Host 608 ("HOST_L1_1") | TIND 606 ("TIND_T_1") TIND 614 ("TIND_UFD_BE") | 0.50 1.00 Host DTP = 1.00 |
| Host 610 ("HOST_L1_2") | TIND 606 (""TIND_T_1") TIND 614 ("TIND_UFD_BE") | 0.50 1.00 Host DTP = 1.00 |
| Host 612 ("HOST_L1_3") | TIND 606 (""TIND_T_1") TIND 614 ("TIND_UFD_BE") | 0.50 1.00 Host DTP = 1.00 |
| Host 604 ("HOST_L1_4") | TIND 606 (""TIND_T_1") | 0.50 Host DTP = 0.50 |
| Host 622 ("HOST_L2_1") | TIND 610 ("TIND_T_L2") | 0.00 Host DTP = 0.00 |
| Host 624 ("HOST_L2_2") | TIND 610 ("TIND_T_L2") TIND 626 ("TIND_W_L2") | 0.00 1.00 Host DTP = 1.00 |
| Host 625 ("HOST_L2_3") | TIND 610 ("TIND_T_L2") TIND 626 ("TIND_W_L2") | 0.00 1.00 Host DTP = 1.00 |
| Host 632 ("HOST_L3_1") | TIND 634 (""TIND_RFID_B2") | 1.00 Host DTP = 1.00 |

TABLE 13

| Host | VM | Impact$_{VM}$ | Host DTP | Risk |
|---|---|---|---|---|
| Host 608 ("HOST_L1_1") | | | 1.0 | |
| Host 610 ("HOST_L1_2") | vm21 | 50 | 1.0 | 50 |
| Host 612 ("HOST_L1_3") | vm32 | 5 | 1.0 | 5 |
| Host 604 ("HOST_L1_4") | vm43 | 100 | 0.5 | 50 |
| | vm11 | 100 | 0.5 | 50 |
| Host 622 ("HOST_L2_1") | vm82 | 100 | 0.0 | 0 |
| Host 624 ("HOST_L2_2") | vm61 | 25 | 1.0 | 25 |
| | vm62 | 10 | 1.0 | 10 |
| Host 625 ("HOST_L2_3") | vm13 | 54 | 1.0 | 54 |
| Host 632 ("HOST_L3_1") | | | 1.0 | |
| System Risk | | | | 244 |

Figure 6D:
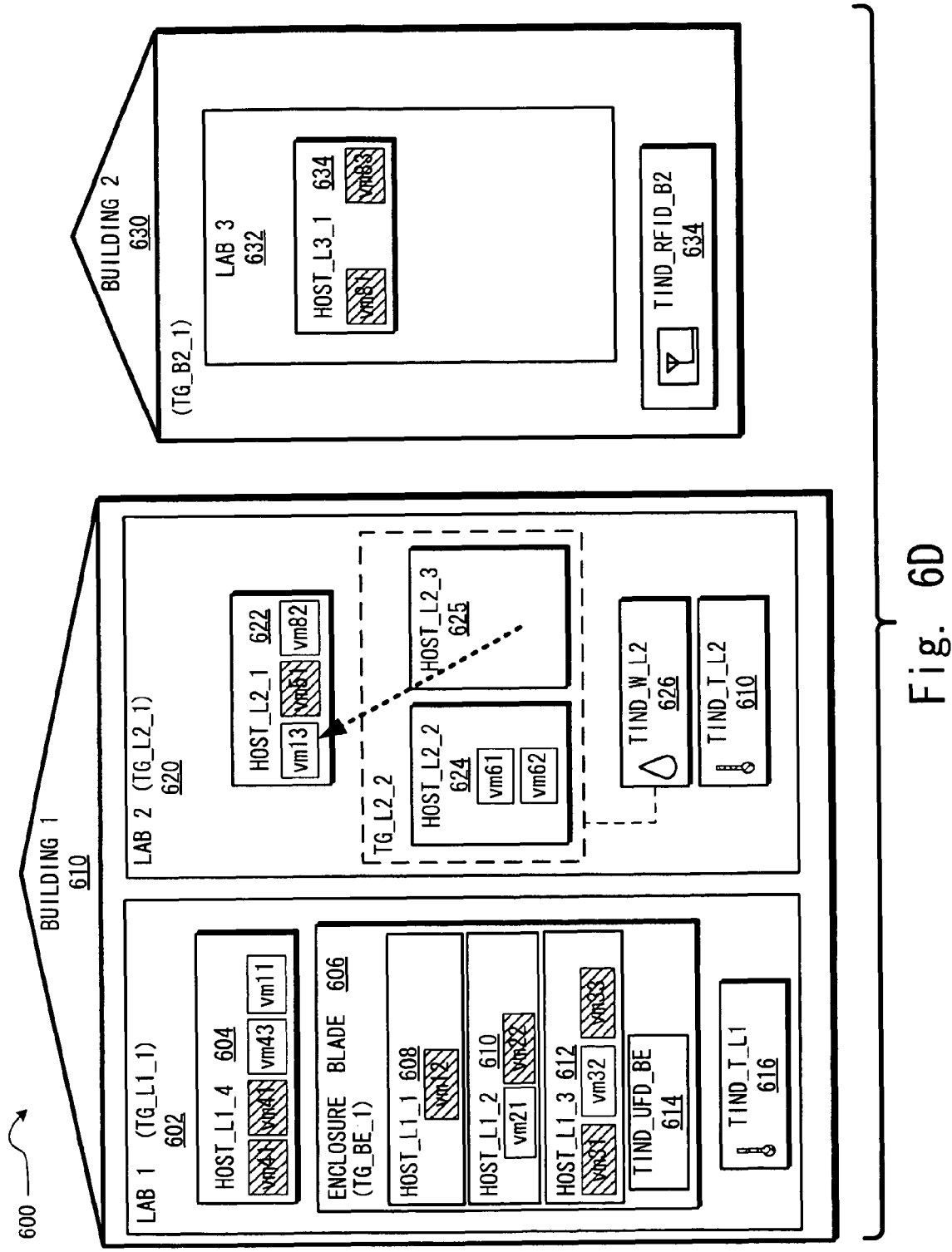

Table 13 is accessed to identify the risk-managed components with the highest associated risks. The risk associated with vm13 has increased to 54, which is higher than the threshold of 50. As a result, mitigation is required for vm13. The system risk parameter has a current value of 244, which still does not exceed the system risk threshold value. Risk orchestrator 106 identifies and evaluates potential target hosts for live-migration of vm13. In this case, the target hosts that would sufficiently reduce risks are host 622 on the upper rack in room 630 ("LAB 2") and host 604 in room 602 ("LAB 1"). Additionally, the target incurring the least cost and the least disturbance would be host 622, since it requires moving vm13 within the same room. Thus, vm13 is moved to host 622 as shown in FIG. 6D. Risk-managed components vm61 and vm62 are left vulnerable to the water threat source in accordance with the administrator definition of their corresponding impact. If a constant risk-balancing policy was in place, then those VMs would probably also be moved away from the lower rack in the room.

Post mitigation risk assessment holds that risk associated with vm13 has been reduced from 54 to 0, and that the system risk has been reduced from 244 to 190 (or 42% of potential system risk), which is still less than the threshold value of 70%.

If the system risk threshold were exceeded, then system MCAs may be carried out. It should be understood that the threshold for system risk may be set independently of the thresholds for risks to individual VMs or other risk-managed components such as services. It is possible for system risk to be exceeded where risks associated with risk-managed components cannot be further reduced, even though the risks exceed their threshold(s). However, it is also possible for the system risk to be exceeded even though none or a very few risk-managed components exceed their threshold. In the present example, if the risk threshold for risk-managed components is set to 60 and the system risk is set to 50%, even if all risk managed components are below their threshold of 60, the system risk can still be in excess of the system risk threshold of 50%.

In one embodiment, when a system risk exceeds the system risk threshold, it is first determined whether it is possible to reduce the system risk to below the threshold by carrying out MCA actions on individual risk-managed components. If these VM MCAs have the potential to reduce system risk below the system risk threshold, the VM MCAs are carried out and the system risk re-evaluated. If the VM MCAs cannot sufficiently reduce the risk, then one or more system MCAs may be carried out, e.g., as specified in Table 4.

MCAs can be configured to be carried out conditionally or unconditionally, in parallel, or serially. For example, an MCA may be carried out only if the previous MCA failed, or regardless as to the failure of the previous MCA. Multiple MCAs may be carried out concurrently, or each MCA may wait for the previous MCA, if any, to complete. In the example shown in FIG. 3, system MCAs are carried out one after the other, regardless as to whether the previous MCA failed or not. The first system MCA is to snapshot all the risk-managed VMs. This provides a backup of the current state of the virtual infrastructure. The second system MCA is configured to carry out whether the first system MCA succeeded or failed. In this case, the second system MCA is to implement a disaster recovery operation. The disaster recovery operation may be to start a copy of the virtual infrastructure at a remote site. In one embodiment, VMware® Site Recovery Manager™ from VMware, Inc. may be used for implementing the disaster recovery operation. Most modern datacenters have a disaster recovery plan in case a datacenter is wiped out, e.g., by a tornado, power failure, or other disaster. Implementing a disaster recovery using virtualized resources can be completely or partially automated. In one embodiment, the disaster recovery plan may be triggered as an MCA in response to risk exceeding a predetermined threshold. Next, regardless as to the success or failure of implementing the second system MCA, the third and final system MCA is carried out, which is the shutdown of all hosts.

It should be recognized that, although the present examples show a single threshold triggering various VM or system MCAs, it is possible to have a more elaborate logic wherein multiple thresholds exist, with differing MCAs configured for the different risk thresholds. For example, one can imagine one MCA to carry out if risk reaches a medium level, and a separate, more drastic MCA to carry out if risk is at such a high level that downtime of the entire system is imminent.

Furthermore, since risk levels are dynamic and constantly changing, an adaptive approach may be implemented based on whether threat severity is increasing or decreasing. For instance, if the temperature in a datacenter is at 100° F. (38° C.) and increasing, associated downtime probability may be greater than if the temperature is at 100° F. and decreasing. Logic for managing changing threat values can be incorporated using the DTP conversion algorithms or scripts as described above.

Although the above embodiments are directed primarily to external or environmental threats, it should be understood that virtual machines can also be vulnerable to threats emanating from the guest operating system or applications executing from within the VM. As far as IT risk management is concerned, none of the mechanism's components and operations need to change in order to accommodate these internal threats. Thus, it is possible to manage the risk emanating from within the VM, in addition to the risk related to the operating environment. For example, suppose a virus is detected in the guest operating system within a particular VM containing a critical database application. The presence of the virus could indicate that security of the guest operating system has been compromised potentially enabling an unauthorized user to gain access to critical data or infrastructure elements. A threat indicator may be configured to generate a TIM in case of the virus or other malware intrusion into the guest operating system, elevating the risk associated with the virtual machine to a level above a threshold. Even though the VM is not experiencing downtime, IT risk management would get an indication of downtime from the implemented threat indicator, and could choose, for example to patch the guest OS, e.g., using VMware® Update Manager.

Managing risk can have a side benefit of improving system performance, since degradations in performance can be perceived as a threat. For example, VMware® Fault Tolerance (FT) is designed to solve loss of availability. As mentioned previously, in FT, a primary VM executing on a primary host is executed in lock-step with a shadow VM executing on a secondary host. If the primary host crashes, the shadow VM executing on the secondary host immediately takes over the functions of the primary VM with little or no loss in availability. Since downtime, as far as IT risk management is concerned, covers degradation of availability as well, FT can be triggered to solve a different set of problems. In one embodiment, impact values of VMs backed up by shadow VMs using Fault Tolerance may be adjusted to reflect a reduction in impact (and therefore risk) to the organization should the primary VM experience downtime due to the redundancy imposed by the shadow VM. Thus, in this case, Fault Tolerance is an MCA which reduces risk by reducing the impact of the VM rather than by reducing the downtime probability of the VM. In another embodiment, the risk of the primary VM is calculated using the host DTP of whichever of the first and secondary hosts has the lower DTP.

The use of the IT risk management system described above allows for more intelligent decisions to be made when taking (or not taking) automated corrective actions. For example, if a host is linked to a faulty network switch, this will translate into network slowness for the virtual machine executing on it. In case that virtual machine is the primary VM in an FT pair, and if the secondary virtual machine is running on a host behind a different switch, IT risk management may switch the execution to the secondary VM, even though the primary VM has not experienced loss of availability. This can all occur using the mechanisms described above, simply by placing hosts behind the network switch in a threat group, polling the network switch to identify degradation performance and converting such performance degradations to a threat indication message, and triggering FT fail-over (or live migration if FT is not available) as the configured MCA.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network, the data maybe processed by other computers on the network, e.g., by a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing risk to an organization associated with each of a plurality of virtual machines (VMs) each running on one of a plurality of hosts, each host being a physical computer system connected to one or more networks and in communication with a risk orchestrator for carrying out the method, the risk orchestrator being an application in communication with the plurality of hosts and a threat indicator, the method comprising:

receiving at the risk orchestrator a threat indication message from the threat indicator, the threat indication message indicating a status of a threat to which a plurality of hosts in a threat group are vulnerable;

calculating a downtime probability resulting from the threat;

calculating a host downtime probability for each host, the host downtime probability being a function of all the downtime probabilities from all threats for which the host is vulnerable;

for each risk-managed VM, calculating a risk value associated with the VM, the risk value being a function of the host downtime probability for the host on which the VM is running and an impact value for the VM, the impact value being a value reflecting a relative importance of the VM to the organization;

identifying each risk-managed VM requiring risk mitigation, the identifying being in accordance with a policy, prioritizing the risk-managed VMs requiring risk mitigation in an order starting with one of the risk-managed VMs having a highest associated risk;

performing a configured mitigation control action on each of the risk-managed VMs requiring risk mitigation, in the order of the prioritization.

2. The method of claim 1, wherein calculating the host downtime probability further includes, solving $DTP_{HOST}=1-\Pi_{i=1\ldots n}(1-DTP_{TINDi})$, where $DTP_{HOST}$ is the host downtime probability, i is an integer from 1 to n, n is the number of threats, $TIND_i$ is the threat indicator for threat i, and $DTP_{TINDi}$ is the downtime probability resulting from threat i.

3. The method of claim 1, further comprising, calculating a system risk as a sum of all the VM risks for all the VMs; and performing a system mitigation action when the system risk exceeds a residual system risk threshold.

4. The method of claim 3, wherein the system risk threshold is configured as a preconfigured percentage of a maximum system risk which is equal to a sum of all maximum VM risks for all the VMs.

5. The method of claim 3, wherein the system mitigation action includes one or more actions selected from a group consisting of moving all VMs to a host with a smallest host downtime probability, taking a snapshot of VMs, powering off all VMs, shutting down all hosts, shutting down guest operating system (GOS) in the VMs, switch VMs to a different site by invoking disaster recovery operations.

6. The method of claim 1 wherein the policy is to provide sufficient risk mitigation with minimum disruption or cost, and the identifying of the risk-managed VMs requiring risk mitigation comprises comparing each the risk value associated with risk-managed VM to a threshold, and deeming the risk-managed VM as requiring risk mitigation when the risk value for that VM exceeds the threshold.

7. The method as recited in claim 1 wherein the policy is to perform ongoing risk balancing, and the identifying of the risk-managed VMs requiring risk mitigation comprises identifying risk-managed VMs having highest associated risk for which risk mitigation has not been recently attempted as requiring risk mitigation.

8. The method as recited in claim 1, wherein the performing of a configured mitigation control action comprises migrating the VM from a current host to a selected target host, the selected target host having a downtime probability sufficiently low so that the VM being migrated no longer requires risk mitigation according to the policy.

9. The method of claim 8, wherein the policy is to provide sufficient risk mitigation with minimum disruption or cost, and the selection of the target host comprises selecting a target host such that upon migration the VM being migrated will have an associated risk value below a threshold, wherein the VM is not considered to require risk mitigation when the associated risk is below the threshold.

10. The method of claim 8, wherein the policy is to reduce risk to a minimum value, and the selection of the target host comprises selecting a target host with the lowest host downtime probability.

11. The method of claim 1, wherein the configured mitigation control action for the risk-managed VM requiring risk mitigation includes one or more actions selected from a group consisting of taking a snapshot of the VM, migrating or live-migrating the VM, suspending the VM, powering down the VM, implementing a shadow VM for potential fail-over, failing-over the VM to an existing shadow VM, restarting the VM, and shutting down the VM.

12. A machine readable storage medium embodying computer code for a risk orchestrator, the risk orchestrator managing risk to an organization associated with each of a plurality of virtual machines (VMs), each VM running on one of a plurality of hosts, each host being a physical computer system connected to one or more networks and in communication with the risk orchestrator, the risk orchestrator being an application in communication with the plurality of hosts and at least one threat indicator, risk orchestrator causing a computer system to carry out a method, the method comprising:
 receiving at the risk orchestrator a threat indication message from one of the threat indicators, the threat indication message indicating a status of a threat to which a plurality of hosts in a threat group are vulnerable;
 calculating a downtime probability resulting from the threat;
 calculating a host downtime probability for each host, the host downtime probability being a function of all the downtime probabilities from all threats for which the host is vulnerable;
 for each risk-managed VM, calculating a risk value associated with the VM, the risk value being a function of the host downtime probability for the host on which the VM is running and an impact value for the VM, the impact value being a value reflecting a relative importance of the VM to the organization;
 identifying each risk-managed VM requiring risk mitigation, the identifying being in accordance with a policy, prioritizing the risk-managed VMs requiring risk mitigation in an order starting with one of the risk-managed VMs having a highest associated risk;
 performing a configured mitigation control action on each of the risk-managed VMs requiring risk mitigation, in the order of the prioritization.

13. The machine readable storage medium of claim 12, wherein the calculating of the host downtime probability further includes, solving $DTP_{HOST}=1-\Pi_{i=1\ldots n}(1-DTP_{TIND i})$, where $DTP_{HOST}$ is the host downtime probability, i is an integer from 1 to n, n is the number of threats, $TIND_i$ is the threat indicator for threat i, and $DTP_{TIND i}$ is the downtime probability resulting from threat i.

14. The machine readable storage medium of claim 12, wherein the method further comprises:
 calculating a system risk as a sum of all the VM risks for all the VMs; and
 performing a system mitigation action when the system risk exceeds a residual system risk threshold.

15. The machine readable storage medium of claim 14, wherein the system risk threshold is configured as a preconfigured percentage of a maximum system risk which is equal to a sum of all maximum VM risks for all the VMs.

16. The machine readable storage medium of claim 14, wherein the system mitigation action includes one or more actions selected from a group consisting of moving all VMs to a host with a smallest host downtime probability, taking a snapshot of VMs, powering off all VMs, shutting down all hosts, shutting down guest operating system (GOS) in the VMs, switch VMs to a different site by invoking disaster recovery operations.

17. The machine readable storage medium of claim 12, wherein the policy is to provide sufficient risk mitigation with minimum disruption or cost, and the identifying of the risk-managed VMs requiring risk mitigation comprises comparing each the risk value associated with risk-managed VM to a threshold, and deeming the risk-managed VM as requiring risk mitigation when the risk value for that VM exceeds the threshold.

18. The machine readable storage medium of claim 12, wherein the policy is to perform ongoing risk balancing, and the identifying of the risk-managed VMs requiring risk mitigation comprises identifying risk-managed VMs having highest associated risk for which risk mitigation has not been recently attempted as requiring risk mitigation.

19. The machine readable storage medium of claim 12, wherein the performing of a configured mitigation control action comprises migrating the VM from a current host to a selected target host, the selected target host having a downtime probability sufficiently low so that the VM being migrated no longer requires risk mitigation according to the policy.

20. The machine readable storage medium of claim 19, wherein the policy is to provide sufficient risk mitigation with minimum disruption or cost, and the selection of the target host comprises selecting a target host such that upon migration the VM being migrated will have an associated risk value below a threshold, wherein the VM is not considered to require risk mitigation when the associated risk is below the threshold.

21. The machine readable storage medium of claim 19, wherein the policy is to reduce risk to a minimum value, and the selection of the target host comprises selecting a target host with the lowest host downtime probability.

* * * * *